US009672066B2

(12) United States Patent
Arun

(10) Patent No.: US 9,672,066 B2
(45) Date of Patent: Jun. 6, 2017

(54) SYSTEMS AND METHODS FOR MASS DISTRIBUTION OF 3-DIMENSIONAL RECONSTRUCTION OVER NETWORK

(71) Applicant: Live Planet LLC, Los Angeles, CA (US)

(72) Inventor: Rohan Maroly kovumal Arun, Calabasas, CA (US)

(73) Assignee: LIVE PLANET LLC, Los Angeles, CA (US)

( * ) Notice: Subject to any disclaimer, the term of this patent is extended or adjusted under 35 U.S.C. 154(b) by 134 days.

(21) Appl. No.: 14/618,731

(22) Filed: Feb. 10, 2015

(65) Prior Publication Data

US 2015/0262410 A1    Sep. 17, 2015

Related U.S. Application Data

(60) Provisional application No. 61/952,055, filed on Mar. 12, 2014.

(51) Int. Cl.
*G06T 15/08* (2011.01)
*G06F 9/48* (2006.01)
(Continued)

(52) U.S. Cl.
CPC .......... *G06F 9/4881* (2013.01); *G06F 3/1438* (2013.01); *G06F 3/1446* (2013.01); *G06F 3/1454* (2013.01); *G06F 9/445* (2013.01); *G06T 1/20* (2013.01); *G06T 15/005* (2013.01); *G06T 15/08* (2013.01); *G06T 17/10* (2013.01); *H04L 67/1002* (2013.01); *G06T 2200/16* (2013.01);
(Continued)

(58) Field of Classification Search
CPC ... G06T 15/205; G06T 17/005; G06T 11/001; G06T 15/00; G06T 15/04; G06T 15/10; G06T 17/20; G06T 2207/10012; G06T 2207/10024; G06T 2207/10028; G06T 2207/30036; G06T 7/0012; G06T 7/0083; G06T 7/408; H04N 13/0257; H04N 13/00; G06F 3/1438; G06F 3/1446; G06F 3/1454; G06F 9/445; G06F 9/4881; H04L 67/1002
See application file for complete search history.

(56) References Cited

U.S. PATENT DOCUMENTS 5,850,352 A * 12/1998 Moezzi ................. H04N 5/222
345/419
6,525,731 B1 * 2/2003 Suits ....................... G06T 15/04
345/421
(Continued)

OTHER PUBLICATIONS

International Search Report and Written Opinion dated Jun. 19, 2015, from related International Application No. PCT/US2015/019511.
(Continued)

*Primary Examiner* — Sultana M Zalalee
(74) *Attorney, Agent, or Firm* — Foley & Lardner LLP

(57) ABSTRACT

Systems and methods are described for distributing a 3-dimensional model of a target space, including, but not limited to: determining a position of an object within a target space; encoding the position of the object as RGB values associated with at least one pixel of a base frame; and transmitting the base frame to a user device for decoding the position of the object.

23 Claims, 13 Drawing Sheets

(51) Int. Cl.
  *G06T 1/20* (2006.01)
  *H04L 29/08* (2006.01)
  *G06F 3/14* (2006.01)
  *G06T 17/10* (2006.01)
  *G06T 15/00* (2011.01)
  *G06F 9/445* (2006.01)

(52) U.S. Cl.
  CPC  *G06T 2207/10024* (2013.01); *G06T 2210/52* (2013.01)

(56) References Cited

U.S. PATENT DOCUMENTS

| | | | |
|---|---|---|---|
| 7,777,741 | B2 | 8/2010 | Teler et al. |
| 8,655,052 | B2* | 2/2014 | Spooner .................. G06T 7/55 345/419 |
| 8,798,965 | B2 | 8/2014 | Quan et al. |
| 9,087,401 | B1 | 7/2015 | Zheng et al. |
| 9,417,911 | B2 | 8/2016 | Arun |
| 9,516,222 | B2 | 12/2016 | Duparre et al. |
| 2002/0015055 | A1 | 2/2002 | Foran |
| 2004/0062433 | A1* | 4/2004 | Munsell, Jr. .......... G06T 7/0004 382/152 |
| 2004/0217956 | A1* | 11/2004 | Besl .................... G06T 15/00 345/419 |
| 2005/0041031 | A1 | 2/2005 | Diard |
| 2005/0052452 | A1 | 3/2005 | Baumberg |
| 2005/0185823 | A1* | 8/2005 | Brown ............ G08B 13/19604 382/103 |
| 2006/0044313 | A1* | 3/2006 | Lake .................... G06T 15/005 345/501 |
| 2006/0221073 | A1 | 10/2006 | Teler et al. |
| 2007/0005795 | A1 | 1/2007 | Gonzalez |
| 2007/0195099 | A1 | 8/2007 | Diard et al. |
| 2008/0088623 | A1* | 4/2008 | Bukowski ............... G06T 17/00 345/423 |
| 2008/0168135 | A1 | 7/2008 | Redlich et al. |
| 2009/0002263 | A1 | 1/2009 | Pasetto |
| 2009/0109219 | A1 | 4/2009 | DeCoro et al. |
| 2009/0135180 | A1 | 5/2009 | Li |
| 2009/0160866 | A1 | 6/2009 | Pau et al. |
| 2010/0001995 | A1 | 1/2010 | Hamill et al. |
| 2010/0141665 | A1 | 6/2010 | Madruga et al. |
| 2010/0328325 | A1 | 12/2010 | Sevigny et al. |
| 2011/0115792 | A1 | 5/2011 | Tamaoki |
| 2011/0145878 | A1 | 6/2011 | Gronning |
| 2012/0041722 | A1 | 2/2012 | Quan et al. |
| 2012/0131591 | A1 | 5/2012 | Moorthi et al. |
| 2013/0038686 | A1 | 2/2013 | Chen et al. |
| 2014/0040357 | A1 | 2/2014 | McDowell |
| 2014/0071234 | A1 | 3/2014 | Millett |

OTHER PUBLICATIONS

International Search Report and Written Opinion dated Jun. 19, 2015, from related International Application No. PCT/US2015/019525.
US Office Action dated Oct. 21, 2015, from related U.S. Appl. No. 14/537,768.
US Office Action dated Apr. 14, 2016, from related U.S. Appl. No. 14/537,768.
US Office Action dated Apr. 4, 2016 from related U.S. Appl. No. 14/557,238.
International Search Report and Written Opinion dated Jun. 15, 2015, from related International Application No. PCT/US2015/019531.
International Preliminary Report on Patentability dated Sep. 22, 2016, from related application No. PCT/US2015/019511.
International Preliminary Report on Patentability dated Sep. 22, 2016, from related application No. PCT/US2015/019525.
International Preliminary Report on Patentability dated Sep. 22, 2016, from related application No. PCT/US2015/019531.
Cornou, S., M. Dhome, and P. Sayd. "Building reconstruction from N uncalibrated views." International Archives of Photogrammetry Remote Sensing and Spatial Information Sciences 34.5/W12 (2003); 127-132.
Elaksher, A., J. Bethel, and E. Mikhail. "Reconstructing 3d building wireframes from multiple images." International Archives of Photogrammetry Remote Sensing and Spatial Information Sciences 34.3/A (2002): 91-96.
Rigiroli, Paolo, et al. "Mesh refinement with color attributes." Computers & Graphics 25.3 (2001): 449-461.
US Office Action dated Aug. 24, 2016, from related U.S. Appl. No. 14/557,238.
US Notice of Allowance dated Jun. 23, 2016, from related U.S. Appl. No. 14/537,768.
US Office Action dated Feb. 9, 2017, from related U.S. Appl. No. 14/557,238.

* cited by examiner

SYSTEMS AND METHODS FOR MASS DISTRIBUTION OF 3-DIMENSIONAL RECONSTRUCTION OVER NETWORK

CROSS-REFERENCE TO RELATED PATENT APPLICATIONS

This application claims priority from Provisional Application U.S. Application 61/952,055, filed Mar. 12, 2014, incorporated herein by reference in its entirety. This application relates to application Ser. No. 14/537,768, titled SYSTEMS AND METHODS FOR SCALABLE ASYNCHRONOUS COMPUTING FRAMEWORK, and filed on Nov. 10, 2014, which is incorporated herein by reference, in its entirety. This application further relates to application Ser. No. 14/557,238, titled SYSTEMS AND METHODS FOR RECONSTRUCTING 3-DIMENSIONAL MODEL BASED ON VERTICES, and filed on Dec. 1, 2014, which is incorporated herein by reference, in its entirety.

BACKGROUND OF THE INVENTION

1. Field of Invention

Present embodiments relate generally to distributing graphical display information to user devices, and more specifically, distributing graphical display information associated with a 3-dimensional space.

2. Background

Real-time rendering of base data (including rendering of video/images or other suitable data types) for displaying by a large number of user devices may be implemented in various manners. For example, a combination of servers and user device processing may be provided to render at least a portion of the base data at server-side and a portion of the base data at the user-side. In other examples, the base data may be completely rendered at server-side. In either example, cloud-based rendering may allow rendering base data of videos, images, games, and other types of application data from the cloud to reduce or otherwise minimize user-side rendering. As such, latency may become problematic, where the latency is determined based on the time interval defined by receiving a user input (e.g., to view a target space from a certain perspective/view) to outputting a user output (e.g., outputting a video/frame corresponding to the user input). This is because the user input may be encoded to be transmitted to the rendering server, where the user input may be decoded. The rendered result (e.g., the user output) may then be encoded at server-side, transmitted to the user devices, and decoded for consumption. The quality of the user output may be reduced due to artifacts added to the user output by the encoding and decoding processes (especially when a large amount of motion is involved, in cases where the geometry may become complex).

As described, cloud/server-based rendering has drawbacks such as latency, lowered quality of the user output, and the like. In addition, implementation of base data rendering using cloud/servers can be prohibitively expensive. For example, s server to render live video streams may cost up to $5 million dollars for as little as under 2000 users per month.

Therefore, a desire is felt to implement cost-effective systems and methods for rendering the base data for multiple user devices.

SUMMARY OF THE DISCLOSURE

Systems and methods are described herein for distributing graphical display information to a plurality of user devices. In various embodiments, the graphical display information may involve rendered objects in a live scene (as it takes place in a target space). The graphical display information may be associated with segmented 2-dimensional sprites, 3-dimensional objects, and/or other background/static objects (collectively "elements"). Each of the user devices may display a 2-dimensional video/image (e.g., user output) of a given perspective/view of the live scene (e.g., including the rendered elements). The perspective/view of the 2-dimensional video/image may change based on user input (e.g., the user may select the perspective/view of the live scene). Each of the user devices may be a suitable mobile or non-mobile computing device having at least a processor (e.g., a GPU) for local rendering.

A distribution server may be provided to distribute base data to the user devices to be rendered (partially to entirely) at the user devices. In some embodiments, the distribution server may at least include a content distribution network (CDN) for efficient distribution. In other embodiments, the data is distributed over a peer network across users without being routed to a server. The base data may include metadata for rendering each image or frame of video. The base data may be encoded and streamed to the user devices. Each user device may then interpret the base data (e.g., with the GPU of the user device in shader language) to render the video/image locally on the user devices, using the user input to render the camera position locally. As such, latency may be minimized due to reduced time it takes from receiving the user input concerning the perspective/view to outputting the video/image on the user device based on the user input. This is because the loop of input and rendering stays within the user device, and a proxy of the live rendering is transferred to all user devices for camera angle projection. In addition, the delay of the initial processing of video streams may also be minimized. Accordingly, such distribution framework as described herein may be scalable across a large number (e.g., millions) of users automatically over a CDN.

Embodiments described herein relate to systems and methods including, but not limited to, determining a position of an object within a target space; encoding the position of the object as RGB values associated with at least one pixel of a base frame; and transmitting the base frame to a user device for decoding the position of the object.

In some embodiments, the target space is a 3-dimensional volume; and the target space is defined by a plurality of vertices.

In various embodiments, the position of the object is defined by a vertex associated with a coordinates on a 3-dimensional coordinate system.

In some embodiments, the encoding the position of the object as RGB values includes: setting a first coordinate value of the vertex to a corresponding R value; setting a second coordinate value of the vertex to a corresponding G value; and setting a third coordinate value of the vertex to a corresponding B value.

In various embodiments, systems and methods further includes receiving a source frame from a data source. The source frame is a 2-dimensional frame of a source video stream.

According to some embodiments, the determining the position of the object within the target space includes identifying the object on the source frame.

In some embodiments, the determining the position of the object within the target space further includes identifying a reference vertex associated with the position of the object.

In various embodiments, the base frame is encoded from the source frame.

In some embodiments, systems and methods further includes transmitting preliminary information to the user device. The preliminary information comprising one or more of: 3-dimensional object textual data, and object position decoding scheme. The 3-dimensional object textual data comprises data associated with texture of the object. The object position decoding scheme comprises metadata corresponding to the manner in which the position of the object is encoded into RGB values.

In various embodiments, a system is described herein including a model builder configured to: determine a position of an object within a target space; and encode the position of the object as RGB values associated with at least one pixel of a base frame; and a distribution server configured to transmit the base frame to a user device for decoding the position of the object.

In some embodiments, the target space is a 3-dimensional volume. The target space is defined by a plurality of vertices.

In various embodiments, the position of the object is defined by a vertex associated with a coordinates on a 3-dimensional coordinate system.

In various embodiments, the model builder encodes the position of the object as RGB values by: setting a first coordinate value of the vertex to a corresponding R value; setting a second coordinate value of the vertex to a corresponding G value; and setting a third coordinate value of the vertex to a corresponding B value.

In various embodiments, the model builder is further configured to receive a source frame from a data source. The source frame is a 2-dimensional frame of a source video stream.

In some embodiments, the model builder determines the position of the object within the target space by identifying the object on the source frame.

According to various embodiments, the model builder determines the position of the object within the target space by further identifying a reference vertex associated with the position of the object.

In various embodiments, the base frame is encoded from the source frame.

In some embodiments, the distribution server is further configured to transmit preliminary information to the user device. The preliminary information comprising one or more of: 3-dimensional object textual data, and object position decoding scheme. The 3-dimensional object textual data comprises data associated with texture of the object. The object position decoding scheme includes metadata corresponding to the manner in which the position of the object is encoded into RGB values.

According to various embodiments, described is a non-transitory computer-readable storage medium storing program instructions that, when executed, causes a processor to: determine a position of an object within a target space; encode the position of the object as RGB values associated with at least one pixel of a base frame; and transmit the base frame to a user device for decoding the position of the object.

In various embodiments, the position of the object is defined by a vertex associated with a coordinates on a 3-dimensional coordinate system. To encode the position of the object as RGB values includes: to set a first coordinate value of the vertex to a corresponding R value; to set a second coordinate value of the vertex to a corresponding G value; and to set a third coordinate value of the vertex to a corresponding B value.

DETAILED DESCRIPTION

Figure 1A:
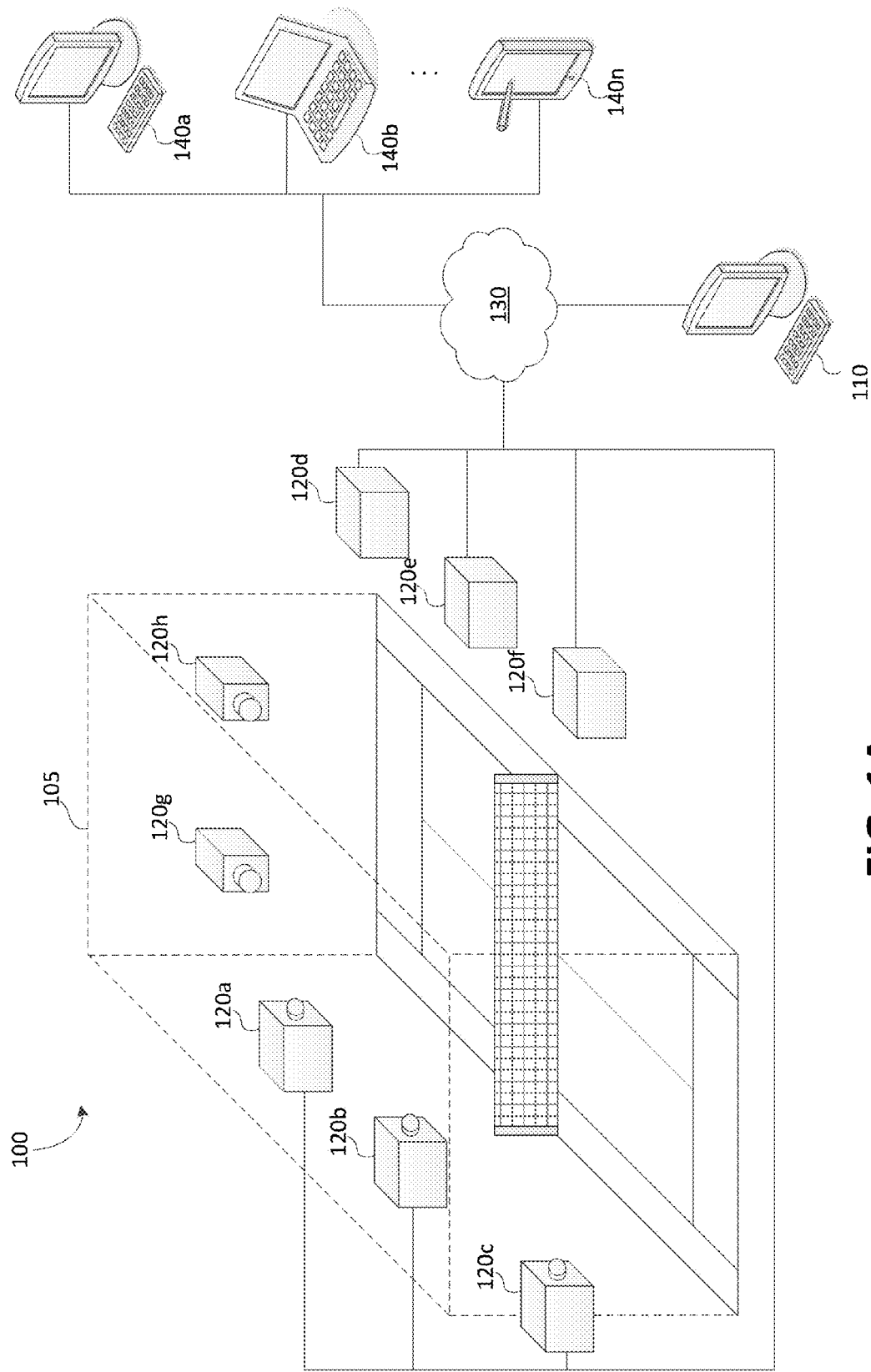
FIG. 1A is a schematic block diagram illustrating an example of a distribution system according to various embodiments.

In the following description of various embodiments, reference is made to the accompanying drawings which form a part hereof and in which are shown by way of illustration specific embodiments in which the invention may be practiced. It is to be understood that other embodiments may be utilized, and structural changes may be made without departing from the scope of the various embodiments disclosed in the present disclosure.

As used herein, "rendering" may refer to processing base data as input to obtain user output, which may be displayed to a user via a display device (e.g., any suitable display screen) of a user device. In some embodiments, rendering may be concerned with projecting 3-dimensional vertices (as well as the display characteristics associated with each) onto a 2-dimensional plane defined by the display device of the user device, to be displayed to the user. The projection may be based on user input (e.g., by the user through a user input device). For example, the user input may define the desired perspective, view, distance, angle, position, and/or the like from which a target space (3-dimensional space) is to be viewed at the user device.

Embodiments described herein relate to systems and methods for distributing and rendering of graphical information of objects in a target space where a live event is occurring. The event can also be recorded and distributed to clients using the same system. The rendering may also be completely synthetic, similar to a video game or movie rendering in real time. In general terms, at least one (sometimes a plurality of) data sources (e.g., cameras) may be provided to capture videos/images of the target space. The 2-dimensional output (e.g., source output) from the data sources may be mapped onto a set of 3-dimensional vertices defining the volume of the target space. Display characteristics (e.g., colors, textures, frequency transforms, wavelet transforms, averages, standard deviations, a combination thereof, and/or the like) may be determined based on the source output for each vertex within the target space. A model of the target space may accordingly be constructed. Such manners of model construction may be one such as, but not limited to, described in application Ser. No. 14/557,238, titled SYSTEMS AND METHODS FOR RECONSTRUCTING 3-DIMENSIONAL MODEL BASED ON VERTICES.

The mapping processes which involves mapping a given vertex of the target space onto an area (e.g., a portion of a pixel, at least one pixel, at least one macro block) of a frame, vice versa, may be executed by a centralized backend server. Alternatively, at least a portion of the processing may be outsourced (e.g., distributed) to user devices for processing. In addition, the determination processes which involves determining display attributes (e.g., a specific color) of a given display characteristic (e.g., color) may also be executed by a centralized backend server or distributed to user devices. One of ordinary skill in the art would appreciate that the user devices that perform the mapping and display characteristics processing as described may also be the user devices to which the base data is sent to be rendered locally, as described herein in detail. The distributed processing may be one such as, but not limited to, described with respect to application Ser. No. 14/537,768, titled SYSTEMS AND METHODS FOR SCALABLE ASYNCHRONOUS COMPUTING FRAMEWORK.

The mapping processes may also include rendering processes mapping pixels to pixels in high resolution (instead of vertices to pixel). Such embodiments may allow rendering a single high resolution scene across multiple servers. While output may simply be the rendered results, the number of sample cameras may be increased to correlate to the density of the servers. Each slice or plane of vertices may be aggregated using streaming peer video.

In various embodiments, the base data may be distributed to user devices for local rendering on the user devices. Given that rendering base data (especially for a live broadcasting) for a large amount of users (e.g., in the magnitude of millions) may be cost-prohibitive when using data centers, rendering at user devices is more cost-effective. As modern user devices (e.g., smartphones, laptops, desktops, tablets, and the like) are provided with powerful processing capabilities (especially with respect to graphics processing at the GPU), each user device may be suited to execute vertices mapping, display characteristics/attributes determination, and rendering. In particular, a web browser or a mobile application (native IOS application) may configure the user devices to perform the vertices mapping, display characteristics/attributes determination, and rendering, as described.

A content distribution network (CDN) may be used to scale the distributed processing over global networks. In particular, CDN streaming may enable a low-cost method of scaling the distribution of the base data (as well as data related to the vertices mapping and display characteristics/attributes determination) to include millions of user devices. This avoids the need to provide render servers in a data center for cloud rendering, which may potentially cost billions of dollars for supporting millions of users simultaneously. In some cases, the distribution systems/methods described herein may cost four orders of magnitude less as compared to cloud rendering, for example, for live streaming for the 3-dimensional target space. In addition, by rendering locally, latency is minimized given that as little data as needed is transmitted from any remote server to the user devices, vice versa. Improved quality of the displayed user output may also be achieved due to the lessening of artifacts, which may be added to the user output by the encoding and decoding processes. In other embodiments, the data is distributed over a peer network across users without going through a server.

Accordingly, the data being distributed is compacted to a smaller normalized size such that all devices can have an expectation of the total bandwidth necessary to render the model of the 3-dimensional space. This allows targeting a large number of various types of devices as end users.

Any geometry (including real time moving geometry) that needs to be rendered may be simplified to be rendered on low-end devices as described herein. Real-time moving geometry includes, but is not limited to: real-time 3D reconstructions, real-time 3D video games, and real-time movie renderings. A high-end video game may be simplified this way and re-rendered on mobile devices without the latency issue with cloud rendering. A high-resolution movie may be rendered in pieces to allow real-time rendering of compute-intensive special effects in real time.

Movies may also be straight rendered to the screen in slices. Such embodiments may require many more nodes for higher resolution requirements in low-end devices. In the case of straight rendering, the number of necessary nodes is equal to (a number of users) X (a number of slices in the render). In the case of rendering 3D geometry, the number of necessary nodes is 4-5+(the number of nodes necessary to render the geometry). The number of nodes necessary to render the geometry may vary depending on resolution. In general, one node is equivalent to one cubic foot of a volume in real-time 3D reconstruction.

This allows sending complex 3D reconstructions across a fixed 4-5 streams, which means streaming and rendering these on mobile devices and laptops are possible. This may also allow interfacing with virtual regards (VR) devices like the Oculus Rift and Samsung VR.

This method can be used to distributed existing rendered geometry generated from depth sensors like the Microsoft Kinect 2.0, allowing the rendering of fixed resolution indoor scenes in real time for a large number of end users. Multiple sensors can be paired together this way to render larger indoor spaces, given depth sensors have limited resolution and range.

FIG. 1A is a schematic block diagram illustrating an example of a distribution system 100 according to various embodiments. Referring to FIG. 1A, the distribution system 100 may include at least a backend device 110, a plurality of data sources 120a-120h (e.g., a first data source 120a, a second data source 120b, . . . , an eighth data source 120h), a target space 105, a network 130, and a plurality of user devices 140a-140n (e.g., a first user device 140a, a second user device 140b, . . . , a n-th user device 140n).

In some embodiments, the network 130 may allow data transfer between the backend device 110 and the user devices 140a-140n. In further embodiments, the network 130 may also allow data transfer between the data sources 120a-120h and the backend device 110/the user devices 140a-140n. In some embodiments, the user devices 140a-140n may supply the source data as well. In a nonlimiting example, Project Tango google devices (e.g., as the user devices 140a-140n) may be the data sources 120a-120h in real time (if the Project Tango google devices were registered to the same coordinate system). The user devices 140a-140n may be connected to each other through the network 130. The network 130 may be a wide area communication network, such as, but not limited to, the Internet, or one or more Intranets, local area networks (LANs), ethernet networks, metropolitan area networks (MANs), a wide area network (WAN), combinations thereof, and/or the like. In particular embodiments, the network 130 may represent one or more secure networks configured with suitable security features, such as, but not limited to firewalls, encryption, or other software or hardware configurations that inhibits access to network communications by unauthorized personnel or entities. The data transmittable over the network 130 may be encrypted and decrypted by the user devices 140a-140n using per frame keys, further securing the data.

In some embodiments, the data sources 120a-120h and the backend device 110 may be connected via a first network, the backend device 110 and the database 170 may be connected via a second network, and the backend device 110 and the user devices 140a-140n may be connected via a third network. Each of the first, second, and third networks may be a network such as, but not limited to the network 130. Each of the first, second, and third networks may be a different network from the other networks in some embodiments. In other embodiments, two of the first, second, and third networks may be a same network.

The target space 105 may be any 3-dimensional space to be captured by the data sources 120a-120h. Examples of the target space 105 include, but are not limited to, a stadium, amphitheater, court, building, park, plant, farm, room, a combination thereof, and/or the like. The target space 105 may be where a live scene takes place. Examples of live scenes include, but not limited to, a match, a concert, an event, a game, a play, and the like. In particular, as shown in FIG. 1A, the target space 105 may be a tennis court, as a non-limiting example. In other words, virtually any venue, location, room, and/or the like may be represented as a 3-dimensional volume such as the target space 105. The target space 105 may be sampled and partitioned into a plurality of discrete volumes, each of which may be associated with a vertex. The model of the target space 105 may include display characteristics/attributes associated with each of the vertices. The target space 105 may also include synthetic spaces like rendered games, simulations, or movies.

Each vertex may be identified by a unique identifier. In particular embodiments, the identifier may be based on position of the vertex in the target space 105. For example, a coordinate system (having 3 axes) may be implemented for the target space 105 such that each vertex may be identified by a particular set of coordinates according to the coordinate system.

Each of the data sources 120a-120h may be connected to the backend device 110 (e.g., via the network 130 or otherwise). The data sources 120a-120h may include any suitable devices for capturing videos and/or images and outputting raw video and/or image data to the backend device 110. The data sources 120a-120h may also be devices that may capture depth data. In particular embodiments, each of the data sources 120a-120h may include at least one camera (e.g., digital cameras, high-definition digital cameras, IP-cameras, or other cameras with network capabilities), at least one sensor (e.g., time of flight sensor), and/or the like.

The data sources 120a-120h may be positioned around or within the target space 105 to capture videos, images, and/or depth data of the target space 105. For example, data sources (such as, but not limited to the data sources 120a-120h) may be positioned around the top, bottom, and/or side surfaces of a target space (such as, but not limited to, the target space 105) and facing an interior of the target space. In further embodiments, the data sources may be positioned within the target space for better coverage of the vertices that may be difficult to be captured if all the data sources were to be positioned outside of the interior volume of the target space. In the non-limited example shown in FIG. 1A, the first data source 120a, the second data source 120b, and the third data source 120c may be positioned along a first side surface of the target space 105; the fourth data source 120d, the fifth data source 120e, and the sixth data source 120f may be positioned along a second side surface of the target space 105; and the seventh data source 120g and the eighth data source 120h may be positioned along a third side surface of the target space 105.

Each of the data sources may have a different or unique camera pose (i.e., the position and orientation of the cameras relative to the target space). For example, the data sources may be positioned in a grid-like manner (spaced evenly) and pointing directly forward in a line of sight perpendicular to a surface of the target space. A plurality of rows and columns of data sources may be provided for a given surface of the target space. In other embodiments, the data sources may be positioned in a random or semi-random pattern. The camera pose of the data sources may be limited by the space around the target space and be placed in positions and orientations based on the available geometry of objects and obstacles in the space around the target space.

Distance may be provided between the surfaces or edges of the target space 105 and the data sources 120a-120h. The longer the distance, the more vertices may be captured by a given data source. On the other hand, longer distance may cause lower resolution of the captured video/image data, thus causing errors when processed. The distance between a data source and the target space may be determined based on camera resolution, the volume of the target space, the number of other data sources available, a combination thereof, and/or the like.

While 8 data sources 120a-120h are shown in FIG. 1A, one of ordinary skill in the art should appreciate that, more or less number of data sources (such as, but not limited to data sources 120a-120h) may be provided. A larger number of data sources spread out around or in the target space may provide for a larger sample size (e.g., more frames of video) for processing, thus providing a large number of weights for a given display attribute associated with a given vertex in a given frame time. Accuracy and faithfulness is thus improved with larger number of weighting values. On the other hand, larger number of data sources may cause prolonged processing due to the increase in unprocessed data.

In cases of extremely low bandwidth to the user devices 140a-140n, the data sources 120a-120h may "orbit" 3D renderings to give an orbiting rendering of the surface of the model or scene. This way, instead of 4-5 data sources, there may be only one data source scanning the scene (e.g., the target space 105) at certain revolutions/second.

Each of the user devices 140a-140n may be any wired or wireless computing system or device having suitable processing and storage capabilities as described. In some embodiments, at least some of the user devices 140a-140n may be a desktop computer, mainframe computer, laptop computer, pad device, or the like, configured with hardware and software to perform operations described herein. For example, each of the user devices 140a-140n may include typical desktop PC or Apple™ computer devices, having suitable processing capabilities, memory, user interface (e.g., display and input) capabilities, and communication capabilities, when configured with suitable application software (or other software) to perform operations described herein. In some embodiments, at least some of the user devices 140a-140n may include a mobile smart phone (such as, but not limited to an iPhone™, an Android™ phone, or the like) or other mobile phone with suitable processing capabilities. Typical modern mobile phone devices include telephone communication electronics as well as some processor electronics, one or more display devices and a keypad and/or other user input device, such as, but not limited to described above. Particular embodiments employ mobile phones, commonly referred to as smart phones, that have relatively advanced processing, input and display capabilities in addition to telephone communication capabilities. However, the user devices 140a-140n, in further embodiments, may include any suitable type of mobile phone and/or other type of portable electronic communication device, such as, but not limited to, an electronic smart pad device (such as, but not limited to an iPad™), a portable laptop computer, or the like.

In general terms, each of the user devices 140a-140n may be a device capable of consuming live video streams and include a GPU capable of accessing shader language to interpret data in the video streams efficiently to allow live stream decoding of information.

The backend device 110 may be at least one server (e.g., computing system) for building the model of the target space 105 and distributing the model (e.g., via the network 130) to the user devices 140a-140n.

Figure 1B:
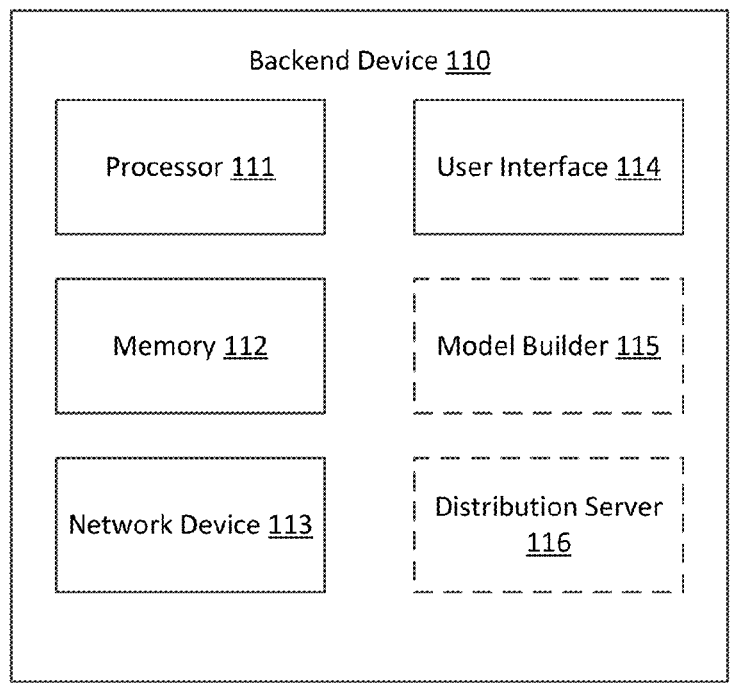
FIG. 1B is a block diagram illustrating an example of the backend device according to various embodiments.

FIG. 1B is a block diagram illustrating an example of the backend device 110 according to various embodiments. Referring to FIGS. 1A-1B, the backend device 110 may include a processor 111, memory 112 operatively coupled to the processor 111, network device 113, user interface 114, and/or the like. In some embodiments, the backend device 110 may include at least one desktop computer, mainframe computer, a server unit, laptop computer, pad device, smart phone device or the like, configured with hardware and software to perform operations described herein.

For example, the backend device 110 may include typical desktop PC or Apple™ computer devices, having suitable processing capabilities, memory, user interface (e.g., display and input) capabilities, and communication capabilities, when configured with suitable application software (or other software) to perform operations described herein. Platforms suitable for implementation include Amazon/Debian Linux, HTML (e.g., HTML5) browsers without plug-ins (such as java or flash), or the like. Thus, particular embodiments may be implemented, using processor devices that are often already present in many business and organization environments, by configuring such devices with suitable software processes described herein. Accordingly, such embodiments may be implemented with minimal additional hardware costs. However, other embodiments of the backend device 110 may relate to systems and process that are implemented with dedicated device hardware specifically configured for performing operations described herein.

The processor 111 may include any suitable data processing device, such as a general-purpose processor (e.g., a microprocessor). In the alternative, the processor 111 may be any conventional processor, controller, microcontroller, or state machine. The processor 111 may also be implemented as a combination of computing devices, e.g., a combination of a DSP and a microprocessor, a plurality of microprocessors, a GPU, at least one microprocessors in conjunction with a DSP core, or any other such configuration.

The memory 112 may be operatively coupled to the processor 111 and may include any suitable device for storing software and data for controlling and use by the processor 111 to perform operations and functions described herein, including, but not limited to, random access memory (RAM), read only memory (ROM), floppy disks, hard disks, dongles or other recomp sensor board (RSB) connected memory devices, or the like.

The network device 113 may be configured for communication over the network 130. The network device 113 may include interface software, hardware, or combinations thereof, for communication over the network 130. The network device 113 may include hardware such as network modems, wireless receiver or transceiver electronics, and/or software that provide wired or wireless communication link with the network 130 (or with a network-connected device). In particular embodiments, the network device 113 may be coupled to the processor 111 for providing communication functions. The network device 113 may provide telephone and other communications in accordance with typical industry standards, such as, but not limited to code division multiple access (CDMA), time division multiple access (TDMA), frequency division multiple access (FDMA), long term evolution (LTE), wireless fidelity (WiFi), frequency modulation (FM), Bluetooth (BT), near field communication (NFC), and the like.

In particular embodiments, the user interface 114 of the backend device 110 may include at least one display device. The display device may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, or the like.

In some embodiments, the user interface 114 of the backend device 110 may include at least one user input device that provides an interface for designated personnel using the backend device 110. The user input device may include any suitable device that receives input from a user including, but not limited to one or more manual operator (such as, but not limited to a switch, button, touchscreen, knob, slider, keyboard, mouse, or the like), microphone, camera, image sensor, any types of remote connection control, or the like.

In some embodiments, the backend device 110 may additional include at least the vertices determination module (reference numeral 115), the weighting module (reference numeral 116), and the job outcome determination module (reference numeral 117) described in the application Ser. No. 14/557,238, titled SYSTEMS AND METHODS FOR RECONSTRUCTING 3-DIMENSIONAL MODEL BASED ON VERTICES.

Still referring to FIGS. 1A-1B, the backend device 110 may additionally include a model builder 115. In some embodiments, the model builder 115 may be hardware/software modules/devices for building a model of the target space 105. The model builder 115 may be a separate hardware/software entity (e.g., a separate server) of the backend device 110 having its own processor/memory (such as, but not limited to the processor 111 and the memory 112). Where the model builder 115 is a separate entity, it may be linked to the rest of the backend device 110 (e.g., the processor 111, the memory 112, the network device 113, and the distribution server 116) via the network 130 or other suitable connections. Alternatively, the model builder 115 may use the processor 111 and memory 112 of the backend device 110. The model builder 115 may package the built model of the target space 105 into consumable data streams to be distributed to the user devices 140a-140n.

The backend device 110 may also include a distribution server 116. In some embodiments, the distribution server 116 may be hardware/software modules/devices for distributing the consumable data streams generated by the model builder 115 to the user devices 140a-140n. The distribution server 116 may be a separate hardware/software entity (e.g., a separate server) of the backend device 110 having its own processor/memory (such as, but not limited to the processor 111 and the memory 112). Where the distribution server 116 is a separate entity, it may be linked to the rest of the backend device 110 (e.g., the processor 111, the memory 112, the network device 113, and the model builder 115) via the network 130 or other suitable connections. Alternatively, the distribution server 116 may use the processor 111 and memory 112 of the backend device 110. The distribution server 116 include a CDN. An examples of CDNs may include, but are not limited to, CloudFront, Limelight, and the like. Media server examples include, but are not limited to, Ffserver, Wowza media server, and the like.

In addition to (or as an alternative to) the memory 112, the backend device 110 may be operatively coupled to the at least one database (not shown) via the network 130 or other suitable connection. The database may be capable of storing a greater amount of information and provide a greater level of security against unauthorized access to stored information than the memory 112 in the backend device 110. The database may include any suitable electronic storage device or system, including, but not limited to random access memory RAM, read only memory ROM, floppy disks, hard disks, dongles or other RSB connected memory devices, or the like. In particular embodiments, the database may be a NOSQL database maintained by a redis server. A database (in addition to or as an alternative to any associated memory devices) such as described may be provided to each of the model builder 115 and the distribution server 116 to store data.

Figure 1C:
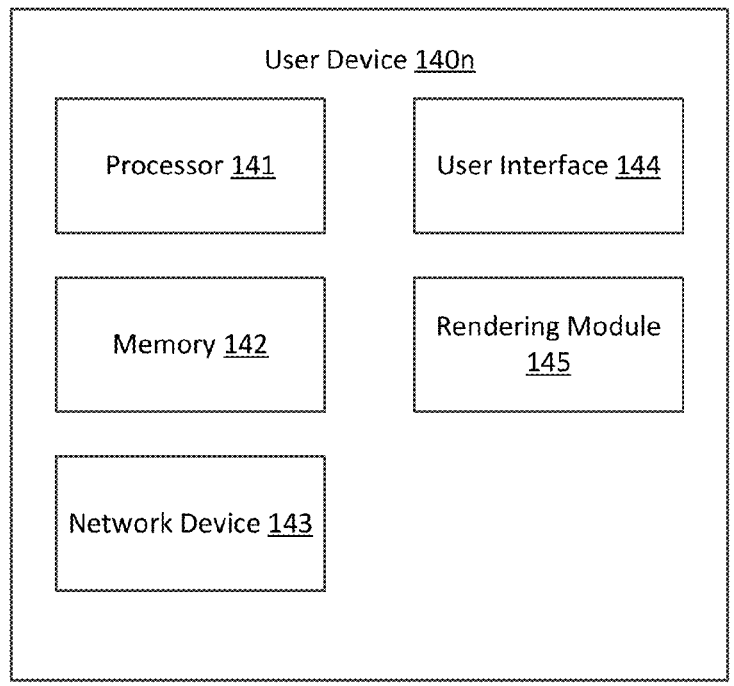
FIG. 1C is a block diagram illustrating an example of a user device according to various embodiments.

FIG. 1C is a block diagram illustrating an example of one (e.g., the user device 140n) of the user devices 140a-140n according to various embodiments. Referring to FIGS. 1A-1C, each of the user devices 140a-140n may include a processor 141, memory 142, network device 143, user interface 144, and rendering module 115.

The processor 141 may be configured to execute general functions of the user devices 140a-140n, such as any suitable data processing. The processor 141 may be a processor such as, but not limited to, the processor 111 of the backend device 110. In particular, the processor 141 may include at least a graphics processing unit (GPU). The memory 142 of each of the user devices 140a-140n may be operatively coupled to the processor 141 and may include any suitable device for storing software and data for controlling and use by the processor 141 to perform operations and functions described herein. The memory 142 may be a memory device such as, but not limited to, the memory 112 of the backend device 110. The network device 143 of each of the user devices 140a-140n may include interface software, hardware, or combinations thereof, for communication over the network 130. The network device 143 may be a network device such as, but not limited to, the network device 113 of the backend device 110.

The user devices 140a-140n may each include a user interface 144 including at least a display device for displaying information (e.g., text and graphics) to the users. The display device may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, or the like. The interface may be configured to display to a user of the user devices 140a-140n the projected video or image of the 3-dimensional model after being rendered.

In some embodiments, the user interface 144 of each of the user devices 140a-140n may include at least one user input device that provides an interface for the users using the user devices 140a-140n. The user input device may include any suitable device that receives input from a user including, but not limited to one or more manual operator (such as, but not limited to a switch, button, touchscreen, knob, slider, keyboard, mouse, or the like), microphone, camera, image sensor, any types of remote connection control, or the like.

Still referring to FIGS. 1A-1C, each of the user devices 140a-140n may include a rendering module 145. In some embodiments, the rendering module 145 may include hardware/software modules/devices for rendering base data received from the backend device 110 (e.g., from the distribution server 116) to generate user output, which may be displayed by the display device of the user interface 144 of the user devices 140a-140n. The rendering module 145 may be a separate hardware/software entity (e.g., a separate device) having its own processor/memory (such as, but not limited to the processor 141 and the memory 142). Where the rendering module 145 is a separate entity, it may be linked to the rest of the user device 140n (e.g., the processor 141, the memory 142, the network device 143, and the user interface 144) via the network 130 or other suitable connections. Alternatively, the rendering module 145 may use the processor 141 and memory 142 of the backend device 110. In particular embodiments, the rendering module 145 may include or otherwise coupled to a GPU, which may be the processor 141 or a processor in addition to the processor 141.

One of ordinary skill in the art would appreciate that, in some embodiments, the distribution system 100 may be a same system as the 3-dimensional model reconstruction system (reference numeral 100) of application Ser. No. 14/557,238, titled SYSTEMS AND METHODS FOR RECONSTRUCTING 3-DIMENSIONAL MODEL BASED ON VERTICES. For example, the target space 105 of the present application may be (but not limited to) the target space (reference numeral 105) in the application Ser. No. 14/557,238. The data sources 120a-120h of the present application may be (but not limited to) the data sources (reference numerals 120a-120h) in the application Ser. No. 14/557,238. The network 130 may be (but not limited to) the network (reference numeral 130) in the application Ser. No. 14/557,238. The backend device 110 of the present application may be (but not limited to) the backend device (reference numeral 110) in the application Ser. No. 14/557,238. In particular, the processor 111, the memory 112, the network device 113, and the user interface 114 of the backend device 110 of the present application may correspond to the processor (reference numeral 111), memory (reference numeral 112), network device (reference numeral 113), and the user interface (reference numeral 114) in the application Ser. No. 14/557,238, respectively. The user devices 140a-140n of the present application may be the user devices (reference numerals 140a-140n) in the application Ser. No. 14/557,238.

In addition, in some embodiments, the distribution system 100 may be a same system as the distributed computing framework (reference numeral 100) of application Ser. No. 14/537,768, titled SYSTEMS AND METHODS FOR SCALABLE ASYNCHRONOUS COMPUTING FRAMEWORK. For example, the target space 105 of the present application may be (but not limited to) the target space in the application Ser. No. 14/537,768. The data sources 120a-120h of the present application may be (but not limited to) the data sources (e.g., the data source 120) in the application Ser. No. 14/537,768. The network 130 may be (but not limited to) the network (reference numeral 130) in the application Ser. No. 14/537,768. The backend device 110 of the present application may be (but not limited to) the backend device (reference numeral 110) in the application Ser. No. 14/537,768. In particular, the processor 111, the memory 112, the network device 113, and the user interface 114 of the backend device 110 of the present application may correspond to the processor (reference numeral 111), memory (reference numeral 112), network device (reference numeral 113), and the user interface (reference numeral 114) in the application Ser. No. 14/537,768, respectively. The user devices 140a-140n of the present application may be the user devices (reference numerals 140a-140n) in the application Ser. No. 14/537,768. In particular, the memory 142, the network device 143, and the user interface 144 of the user device 140n of the present application may correspond to the user device memory (reference numeral 161), user network device (reference numeral 163), and the user device interface (reference numeral 164) of the user device (reference numeral 140n) in the application Ser. No. 14/537,768, respectively. In addition, the processor 141 of the user devices 140n of the present application may correspond to the processing unit (reference numeral 160) and/or the user core (reference numeral 150) of the user device (reference numeral 140n) in the application Ser. No. 14/537,768.

Figure 2:
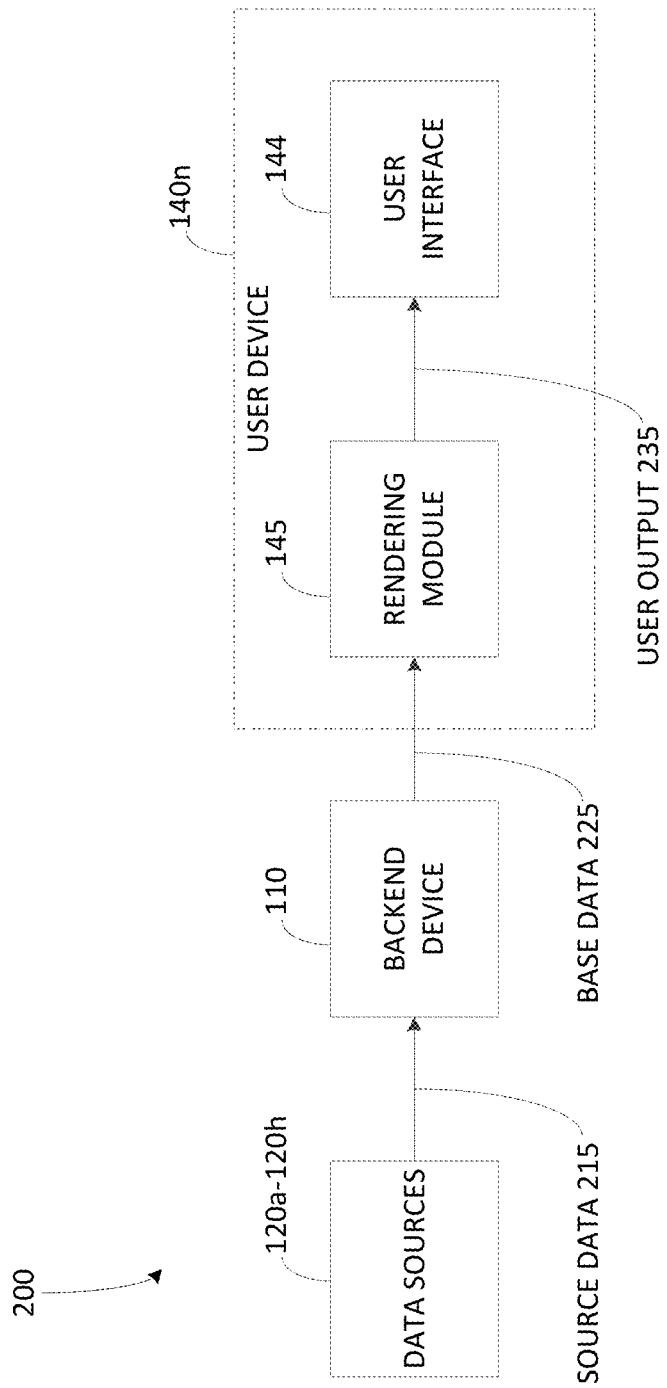
FIG. 2 is a system block diagram illustrating examples of components and input/output data related to the distribution system.
Figure 3:
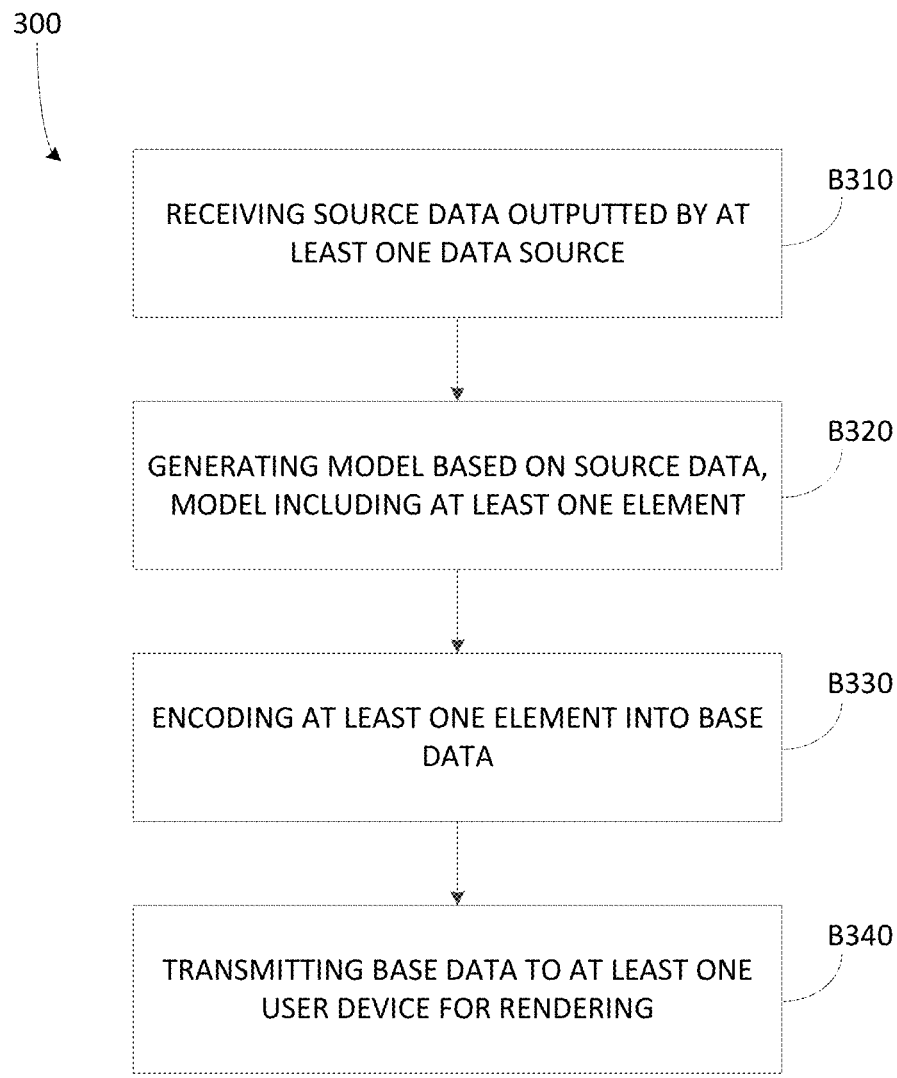
FIG. 3 is a process flowchart illustrating an example of a general distribution method related to the backend device according to various embodiments.
Figure 4:
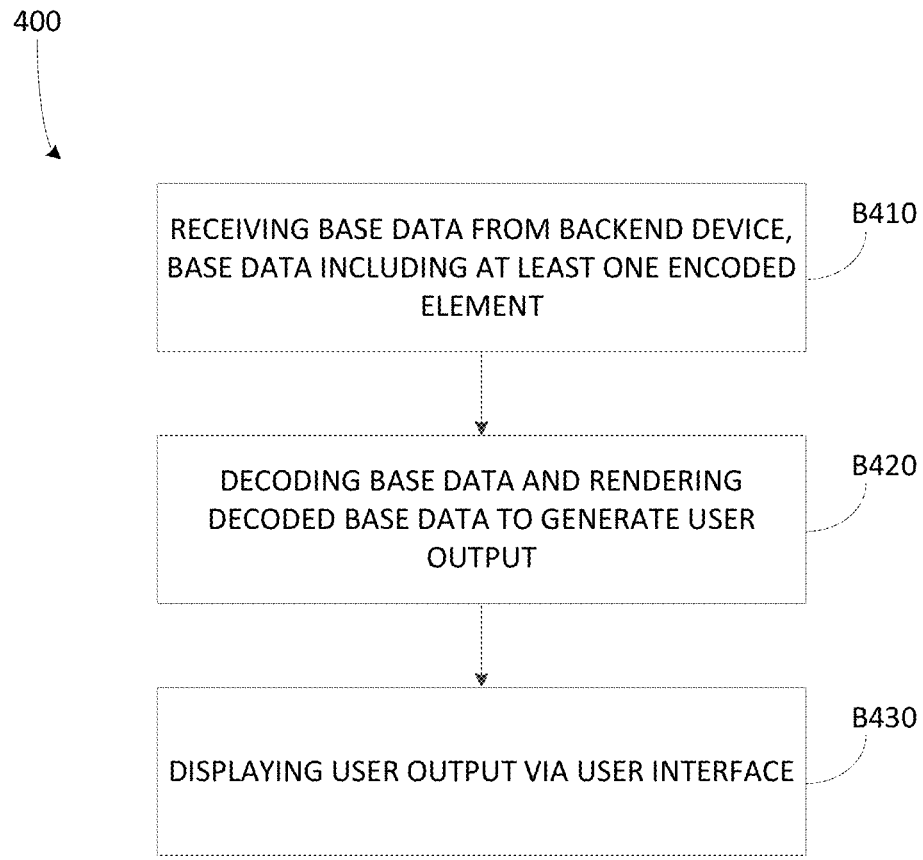
FIG. 4 is a process flowchart illustrating an example of a general model displaying method according to various embodiments.

FIG. 2 is a system block diagram 200 illustrating examples of components and input/output data related to the distribution system 100. Referring to FIGS. 1A-2, the data sources 120a-120h may output source data 215. The source data 215 may be transmitted (e.g., via the network 130) to the backend device 110. The source data 215 may include video, audio, and/or images captured by the data sources 215. In particular embodiments, each of the data sources 120a-120h may output a video stream of the target space 105 (e.g., at a predetermined camera pose). Each video stream may include a plurality of video frames (referred to as sources frames).

The backend device 110, upon receiving the source data 215, may be configured to process (with the model builder 115) the source data 215 and output base data 225. The base data 225 may be transmitted (e.g., via the network 130) from the distribution server 116 of the backend device 110 to the user device 140n. In some embodiments, the model builder 115 of the backend device 110 may associate the vertices defining the target space 105 with an area (e.g., a fraction of a pixel, at least one pixel, at least one macroblock, and/or the like) of a frame of the source data 215, determine display characteristics/attributes associated with each vertex, construct a model of the target space 130 by aggregating the geometry (as provided by the vertices) and the display characteristics/attributes associated with each vertex, and/or the like. In addition, the model builder 115 of the backend device 110 may identify (and segment) mobile or stationary objects from the source data 215 in the manner described. The backend device 110 may encode the position of at least each of the mobile objects into the base data 225, for example, at a current frame. In some embodiments, the base data 225 may include at least one video streams having positional data of at least one mobile object encoded therein, as described in detail herein. In other embodiments, the base data may include signals indicating the positions of the mobile objects. Alternatively, the base data 225 may include a depth video stream as well as the source data 215 simultaneously. The user device 140n may determine a position of an object from the depth video stream and the display characteristics/attributes associated with that object from the source data 215, based on vertices mapping information in the manner described.

In some embodiments, the backend device 110 may itself perform the processes described with the processor 111, or any additional processors associated with the backend device 110 (e.g., at data processing centers) for centralized processing. In other embodiments, at least some of the processes described herein may be outsourced to be processed by at least one of the user devices 140a-140n. In some embodiments, the backend device 110 may not exist. All data managed, stored, or routed by the backend device 110 as described may be maintained on a publicly distributed peer atlas document. Changes in the document may be propagated to all peers in the network in real time along the same peer connections used to transfer data.

In particular embodiments, the base data 225 may be processed first by the rendering module 145 of the user device 140n. The rendering module 145 may convert the coded base data 225 into user output 235, which may be displayable by the user interface 144. For example, the rendering module 145 may decode the base data 225 in shader language, where the base data 225 may be presented in a shader-readable format (e.g., in textures). Then, the rendering module 145 may update the model of the target space 105 stored in the memory 142 based on the decoded information.

Referring to FIGS. 1A-3, FIG. 3 is a process flowchart illustrating an example of a general distribution method 300 related to the backend device 110 according to various embodiments. The general distribution method 300 may be a method executed by the backend device 110 to distribute model reconstruction information of the target space 105 to the user devices 140a-140n for consumption according to various embodiments. In particular embodiments, the models may include information data related to a 3-dimensional object or a 2-dimensional sprite captured within the target space 105.

At block B310, the backend device 110 may receive source data 215 outputted by at least one data source (e.g., at least one of the data sources 120a-120h). Next at block B320, the backend device 110 may generate a model based on the source data 215, the model including at least one element. Generating the model may include, for example, vertices mapping relating to mapping the vertices defining the target space 105 onto areas within frames of the source data 215. In other words, the backend device 110 (by itself or with the distributed processing framework using the user devices 140a-140n) may perform vertices mapping. Generating the model may also include determining display characteristics/attributes associated with each vertex once the backend device 110 receives the source data 215.

Furthermore, generating the model may additionally include identifying and segmenting at least one element in the model. In various embodiments, the elements may refer to at least one moving entity in the model of the target space 105, as captured by the data sources 120a-120h in the live scene occurring within the target space 105. In further or other embodiments, the elements may also include at least one static entity in the target space 105. The elements may be a 3-dimensional object or a 2-dimensional sprite. The backend device 110 may identify the elements by determining perceived depth of bodies associated with the display characteristics/attributes. The backend device 110 (and/or the user devices 140a-140n) may utilize depth perception sensors or vertices determination methods described herein to determine the position of the elements within the target space 105.

In alternative embodiments, generating the model based on the source data may include identifying and segmenting the elements from the source data 215 and streaming a depth video to the user device 140n. The user device 140n may itself determine the position of the elements based on the depth video.

Moving entities may be determined by comparing the display characteristics/attributes of the vertices at a given moment in time (e.g., at a given frame time) with the display characteristics/attributes of the vertices determined previously (e.g., at a previous frame time). Objects having the same display characteristics/attributes that have a different position at a first moment in time as compared to a second moment in time may be determined to be moving entities. In other or additional embodiments, the moving entities may be determined based on suitable motion sensors.

Next at block B330, the backend device 110 may encode at least one element into base data 225. Once the elements are identified, the backend device 110 may segment or otherwise cut out the identified elements and encode each element. In various embodiments, only the moving elements may be segmented and encoded. In other embodiments, all elements in the target space 105 may be segmented and encoded. Regarding the moving elements, position and display characteristics/attributes (or only updates related thereto) of these elements may be encoded in the manner described. In other embodiments, encoding the at least one element may refer to generating the depth video stream based on the source data 215.

Next at block B340, the backend device 110 may transmit the base data 225 to at least one of the user devices 140a-140n for rendering (at the rendering module 145) and displaying (at the user interface 144). The base data 225 may be transmitted in at least one data stream, where each data stream may include information (e.g., position, display characteristics/attributes, depth video streams, and/or the like) related to at least one element.

Referring to FIGS. 1A-4, FIG. 4 is a process flowchart illustrating an example of a general model displaying method 400 according to various embodiments. The general model displaying method 400 may be a process executed by the user devices 140a-140n to display a model to a user of the user devices 140a-140n.

First at block B410, at least one (e.g., the user device 140n) of the user devices 140a-140n may receive (via the network device 143 of the user device 140n) the base data 225 from the backend device 110, where the base data 225 may include at least one encoded element. The base data 225 may be encoded position of the element, or a depth video stream from which the position of the element may be readily determined based on known camera pose associated with the data source associated with the depth video. The base data 225 may also include the source data 215 including display characteristics/attributes of the element.

Next at block B420, the user device 140n (via the rendering module 145) may decode the base data 225 and render the decoded data to generate the user output 235. In various embodiments, the base data 225 may be encoded in any manner. The decoding of the base data 225 may be consistent with any encoding scheme used to encode the base data 225. The user device 140 may render the base data to generate the user output 235 based on user input. The user input may include a desired geometric field of view (e.g., perspective, view, distance, angle, position, and/or the like) from which a target space (3-dimensional space) is to be viewed. For example, where 3-dimensional objects are involved, the rendering module 145 may project the 3-dimensional vertices (some of which may correspond to at least one 3-dimensional object) and the associated display characteristics/attributes unto a 2-dimensional plane as the user output 235. Next at block B430, the user device 140n may display (via the user interface 144, or specifically, the display device of the user interface 144) the user output 235.

Figure 5A:
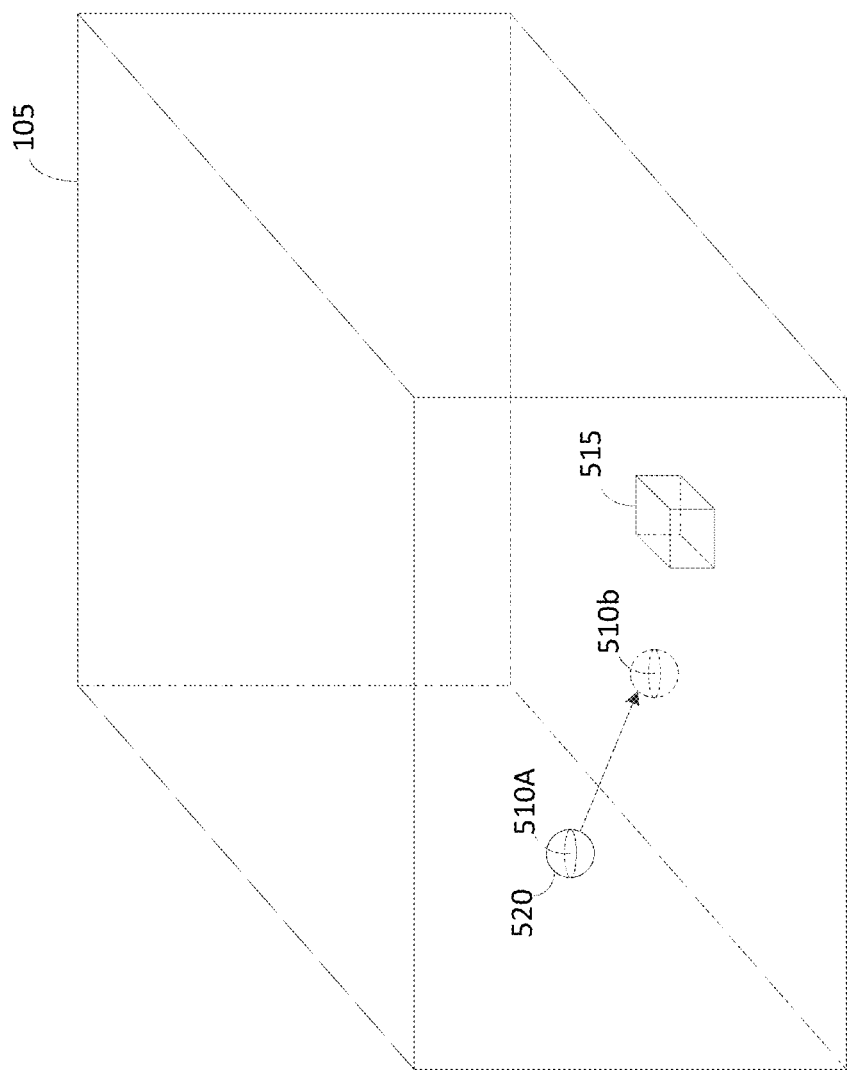
FIG. 5A is a schematic diagram illustrating an example of the target space (including elements) according to various embodiments.

FIG. 5A is a schematic diagram illustrating an example of the target space 105 (including elements) according to various embodiments. Referring to FIGS. 1A-5A, at least two elements (e.g., a first object 520 and a second object 515) may be present in the target space 105. In particular, the first object 520 may be moving from its initial position 510a (as depicted in the current frame) to a new position 510b. In other words, as captured at a first moment in time, the first object 520 may be at the initial position 510a; as captured at a second moment that is subsequent in time as compared to the first moment in time, the first object 520 may be at a new position 510b. The second object 515 may be static. As described, the data sources 120a-120h may be positioned around or within the target space 105 to capture videos/images of at least a portion of the target space 105. At least some of the data sources 120a-120h may capture the first object 520 and/or the second object 515. It should be appreciated by one of ordinary skill in the art that, while additional moving and/or static objects may be implemented in similar manner, two objects (one moving and one static) are described for the sake of simplicity in the non-limiting example set forth with respect to FIG. 5A.

The first object 520 and the second object 515 may be identified by the backend device 110. In various embodiments, the object identification processes may be conducted based on perceived depth associated with vertices captured to be associated with display characteristics/attributes in the manner described. The motion attribute (e.g., whether the object is moving) may also be determined by the backend device 110 with respect to each of the identified object. Thereafter, at least one moving object (e.g., the first object 520), at least one static object (e.g., the second object 515), or both may be segmented from the video streams/images captured by at least one of the data sources 120a-120h.

Figure 5B:
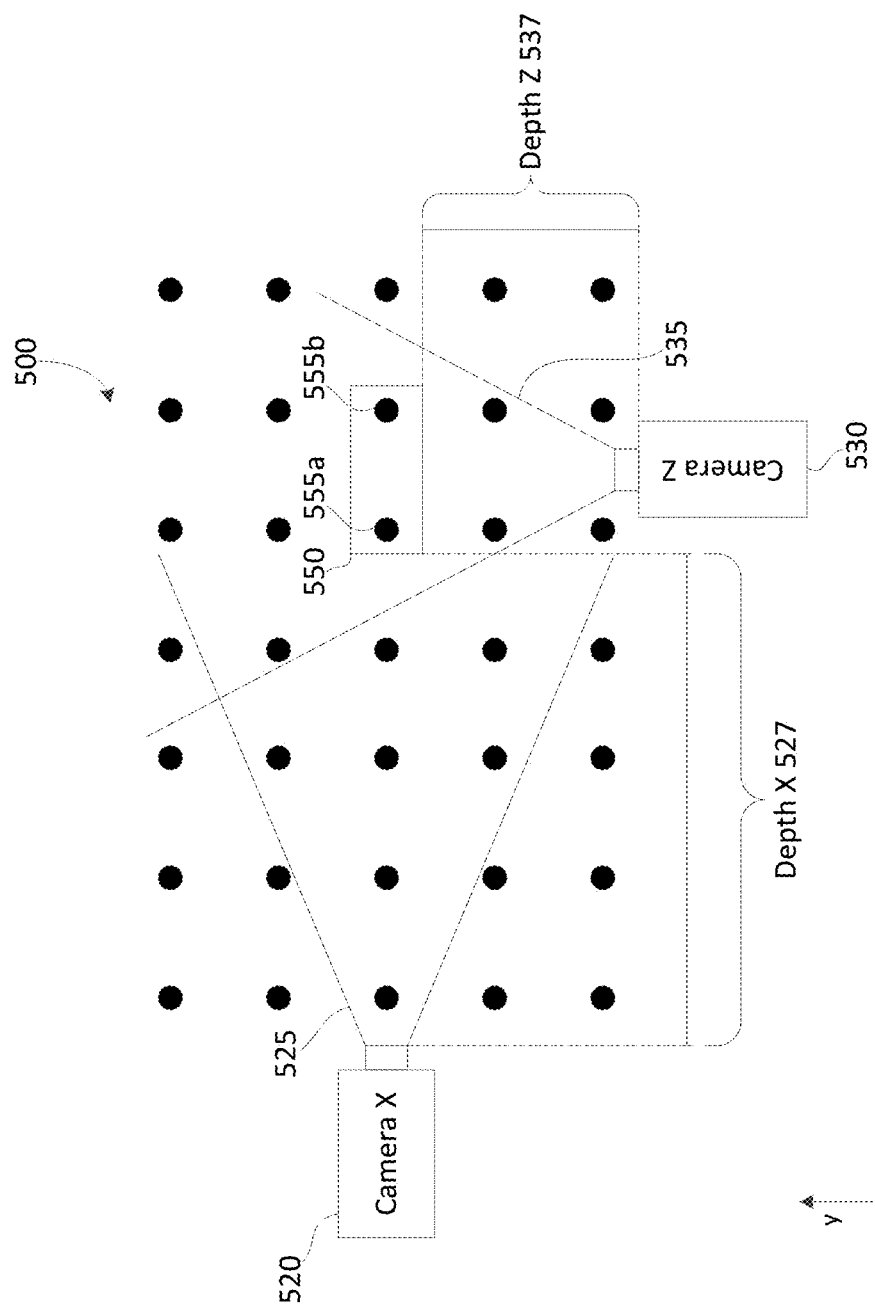
FIG. 5B is a schematic diagram illustrating an example of a plane of vertices of the target space according to various embodiments.
Figures 6A, 6B:
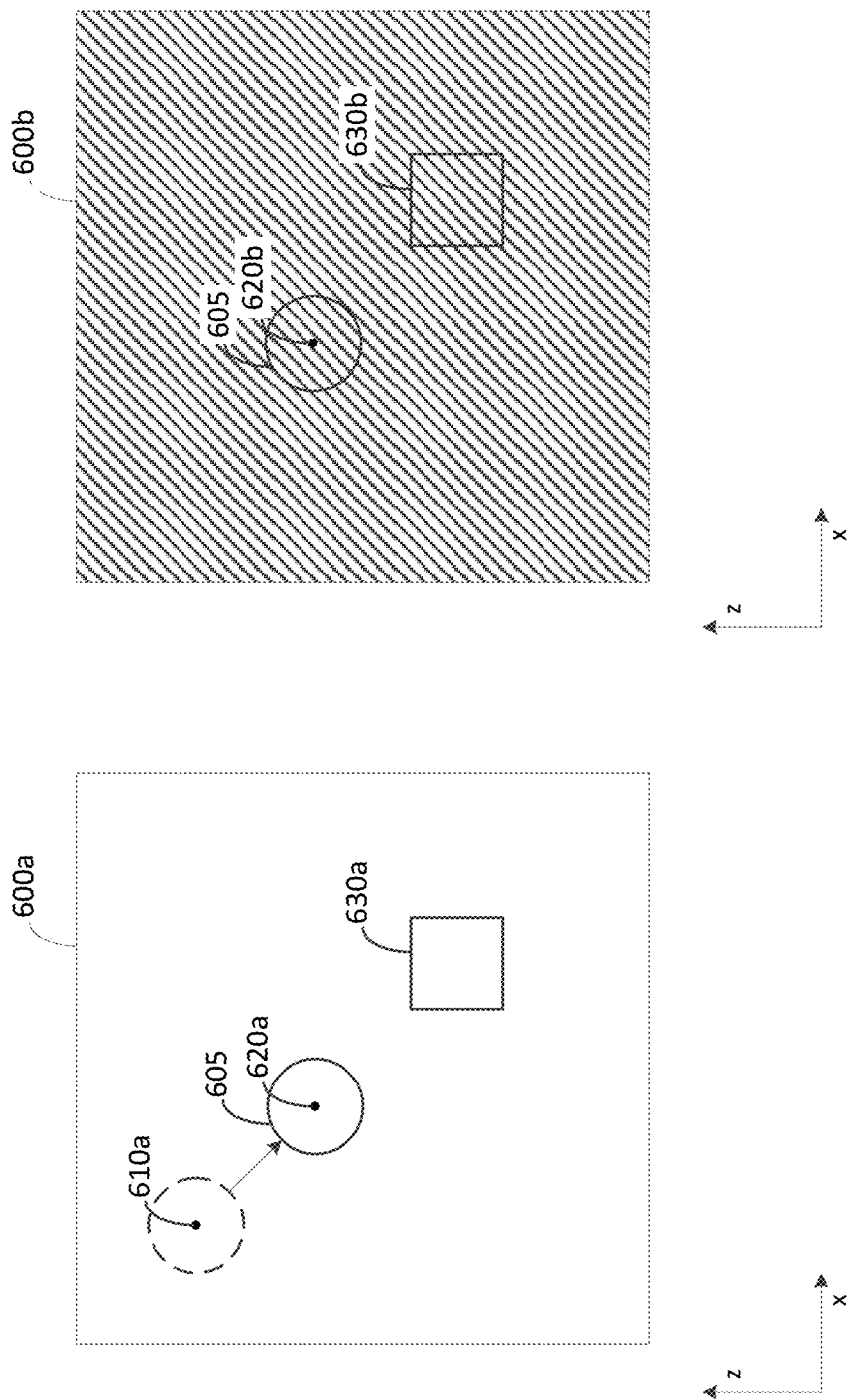
FIG. 6A is a source frame in the source data outputted by one of the data sources.
FIG. 6B is a base frame in the base data outputted by the backend device and transmitted to the user device.

FIG. 5B is a schematic diagram illustrating an example of a plane of vertices 500 of the target space 105 according to various embodiments. The plane of vertices 500 may be a slice (in the x-y plane) of the vertices defining the target space 105. The plane of vertices 500 may illustrate depth determination process for determining a depth with respect to at least one object (e.g., a test object 550) in some embodiments. The determined depth with respect to at least one object (e.g., the test object 550) may be used to determine the position of the at least one object. In various embodiments, the test object 550 may be a 3-dimensional object in the target space 105 associated with vertices 555a, 555b.

Two data sources (e.g., Camera X 520 and Camera Z 530) may be provided to capture display characteristics/attributes of at least the plane of vertices 500. In particular, Camera X 520 may capture the display characteristics/attributes of some of the plane of vertices 500 within Field X 525. Camera Z 530 may capture the display characteristics/attributes of some of the plane of vertices 500 within Field Z 535. The test object 550 may occupy a first vertex 555a and a second vertex 555b.

Both the Camera X 520 and the Camera Z 530 may capture display characteristics/attributes of the test object 550. In particular, the Camera X 520 may capture the test object 550 in the x-direction. The Camera Y 530 may capture the test object 550 in the y-direction. The Camera X 520 may be associated with depth perception (as defined by Depth X 527) in relation to the test object 550. The Camera Z 530 may be associated with depth perception (as defined by Depth Z 537) in relation to the test object 550. Where the depth perception for one of the data sources 120a-120h (e.g., the Camera Y 520 and the Camera Z 530) in relation to an object (e.g., the test object 550) is known, the position (particular set of vertices) of the object may be known by taking into account of the depth perception and the area on the area on a frame/image outputted by the data sources 120a-120h.

In some cases, given the camera pose (i.e., the position and orientation of the cameras relative to the target space 105) associated with the Camera X 520 (e.g., in the x-direction), the Camera X 520 may lack depth perception along the x-direction (e.g., the Depth X 527). However, Camera X 520, due to its camera pose, may output information relating to the depth perception along an axis perpendicular to the x-direction (e.g., the Depth Z 537). In particular, the output (e.g., the source data 215, which may be frames of videos or images) from Camera X 520 may be used to approximate depth Z 537 of the test object 550. Similarly, given the camera pose associated with the Camera Z 530 (e.g., in the y-direction), the Camera Z 530 may lack depth perception along the y-direction (e.g., Depth Z 537). However, Camera Z 530, due to its camera pose, may output information relating to the depth perception along an axis perpendicular to the z-direction (e.g., Depth X 527). In particular, the output (e.g., the source data 215, which may be frames of videos or images) from Camera Z 530 may be used to approximate Depth X 527 of the test object 550. The source data 215 from either cameras 520, 530 (and other additional data sources such as data sources 120a-120h) may be used to determine corresponding vertices associated with the test object 550. Once the corresponding vertices are determined, the depth perception (e.g., the Depth X 527 and the Depth Z 537) may be determined given that spaces between the vertices and the position of the vertices are known.

In alternative embodiments, the depth perception associated for a given data source in relation to an object may be determined by using suitable depth sensors (e.g. a time of flight sensor).

In other words, determining the depth perception associated with the test object 550 may relate to vertices mapping of the test object 550. The vertices defining the test object 550 may be determined. Given that the vertices relate the discrete volumes within the target space 105, the position of the test object 550 may accordingly be determined. For example, the vertices corresponding to any 3-dimensional object as well as the display characteristics/attributes associated with each of the corresponding vertices may be determined as described in application Ser. No. 14/557,238, titled SYSTEMS AND METHODS FOR RECONSTRUCTING 3-DIMENSIONAL MODEL BASED ON VERTICES.

Now referring to FIGS. 1A-6A, FIG. 6A is a source frame 600a in the source data 215 outputted by one of the data sources 120a-120h (e.g., the data source 120h). The source frame 600a may include a current object 605 associated with a current position 620a. The current object 605 may move from an initial position 610a (at a previous frame) to the current position 620a at the current frame. The source frame 600a may also include a static object 630a, which has not moved in at least a number (e.g., 100, 200, 1000, or the like) of previous frames (or since the first frame of a session).

In some embodiments, the current position 620a may include at least one reference vertex associated with the current object 605. The current position 620a may be a reference vertex that is in a center of vertices defining the current object 605 (as shown in the non-limiting example of FIG. 6A). In other embodiments, the reference vertex defining the current positions for objects may be at a bottom, side, top, internal to the objects, external to the objects, and/or the like. Suitable relations between reference vertices to positions of object schemes (position schemes) may be written in program instructions (e.g., metadata). The position schemes may be shared between (and stored on) the backend device 110 and the user devices 140a-140n, such that the position schemes are consistent on devices for encoding and decoding the positions of objects such as, but not limited to, the current object 605.

Given the depth perception determined associated with the data source 120h with respect to the current object 605, the backend device 110 (upon receiving the source frame 600a) may determine the current position 620a of the current object 605 based on the depth perception and the area associated with the current object 605 in the source frame 600a.

In alternative embodiments, the backend device 110 may utilize other suitable algorithms in determining the current position 620a of the current object 605. For example, the backend device 110 may determine, for the current frame time associated with the source frame 600a, the display characteristics/attributes associated with each of the vertices (or a subset of vertices sufficiently encompassing a potential volume in which the current object 605 may move to) in the target space 105. The backend device 110 may take into account the source frame 600a as well as other frames captured at the same frame time. Next, the backend device 110 may compare the display characteristics/attributes and geometry associated with each of the vertices (or the subset of vertices described herein) at the current frame time with those at a previous frame time to determine whether a group of vertices having the same geometry and same or substantially similar characteristics/attributes has repositioned itself.

Referring to FIGS. 1A-6B, FIG. 6B is a base frame 600b in the base data 225 outputted by the backend device 110 and transmitted from the backend device 110 to the user device 140n. In various embodiments, the base frame 600b may be a frame in a video stream transmitted from the backend device 110 (in particular, the distribution server 116) to the user device 140. In various embodiments, each frame of the video stream may include position information (e.g., which is at the current encoded position 620b, which may correspond to the current position 620a) relating to at least one object (e.g., the current object 605) that is at least partially shown in the base frame 600*b*. In various embodiments, position of the objects (e.g., the current encoded position 620*b* and the position of a current static object 630*b*) in the base frame 600*b* may be the same as the position of the corresponding objects (e.g., the current position 620*a* and the position of the static object 630*a*) in the source frame 600*a*.

By way of illustrating with a non-limiting example, the encoded current position 620*b* (as well as the current position 620*a*, which may be the same given that both the base frame 600*b* and the source frame 600*a* are frames from a same data source at a same frame time) may be expressed by the color scheme of the base frame 600*b*. In some embodiments, the model builder 115 may determine the position of the current object 605 at the current frame time in terms of vertices and assign a corresponding current position 620*a* based on position schemes shared between the backend device 110 and the user device 140*n*. The current position 620*a* (and the encoded current position 620*b*) may be encoded into suitable aspects of the base frame 600*b* (or the video stream), including color scheme.

The color associated with pixels of the base frame 600*b* may be represented in RGB color model. A resultant color for each pixel may be determined based on corresponding R (red), G (green), and B (blue) values. For each of R, G, and B, a value of 0-255 may be assigned. The vertices may also be assigned a value to determine its position. For example, a vertex in the 3-dimensional context may be represented by its x, y, and z coordinates. Therefore, the RGB model may be used to encode the positional data of the current position 620*a* (and the encoded current position 620*b*). For example, a vertex (corresponding to the current position 620*a* and the encoded current position 620*b*) having coordinates (X, Y, Z) in the target space 105 may be encoded to R=X, G=Y, and B=Z. To illustrate with a non-limiting example, a vertex having coordinates of (20, 134, 244) may be encoded to R=20, G=134, B=244. Therefore, at least some of the pixels in base frame 600*b* of the video stream from the backend device 110 (e.g., the distribution server 116) to the user device 140*n* may have the color corresponding to a shade of blue (R=20, G=134, B=244). The identities of these pixels may be defined in the encoding color schemes shared between the backend device 110 and the user device 140*n*.

In some embodiments where each of the base frame 600*b* encodes position data of a single object, every pixel may be encoded with the result color in RGB model corresponding to the position of that object. In other embodiments where each of the base frame 600*b* encodes position data of a single object, at least one but not all pixel may be encoded with the result color in RGB model corresponding to the position of that object. The rest of the pixels may be encoded with filler RGB values (e.g., R=0, G=0, B=0).

Given that 256 RGB values are used to represent color while vertex coordinates in the magnitudes of 1000s, 10,000s, 100,000s, and/or the like on each axis may be used, a scaling scheme may be implemented to correspond two or more consecutive coordinate values of a vertex with a single RGB value. By way of illustrating with a non-limiting example, a target space 105 defined by 2560×2560×2560 vertices may be mapped to RGB values such that every 10 coordinate values may correspond to 1 RGB value. A vertex having coordinate values (18, 539, 2007) may correspond to R=2, G=53, and G=200). However, such scaling may negatively impact resulting resolution and accuracy of the reference vertex (position).

In some cases, an offset may be used to shift a range of the 256 RGB values such that scaling may not be necessary. In some embodiments, a combination of methods may be used for maximum efficiency and flexibility.

In various embodiments, the positions of two or more objects may be encoded in a same base frame (e.g., the base frame 600*b*). At least a portion of all pixels in the base frame (e.g., a pixel, all pixels within an area of the base frame, and/or the like) may be encoded to correspond to the position of a first object while a separate portion of all pixels in the base frame may be encoded to correspond to the position of a second object. The corresponding relationship between a particular area on the base frame and the identity of the object it represents may be shared as metadata between the backend device 110 and the user device 140*n*.

In some embodiments, the objects having their positions encoded for may be moving objects only, given that static objects remain in the same position and do not need to be updated for a new position. In other embodiments, the position of at least one static object (such as, but not limited to, the current position 620*a* and the position of the static object 630*a*) may be encoded in a similar manner.

In other embodiments, a base frame may encode position information related to an object not shown in the base frame. This may be possible as long as instructions (metadata) may be shared between the backend device 110 and the user device 140*n* as to the identity of object(s) corresponding to the encoded position(s) encoded in the base frame.

Figure 7:
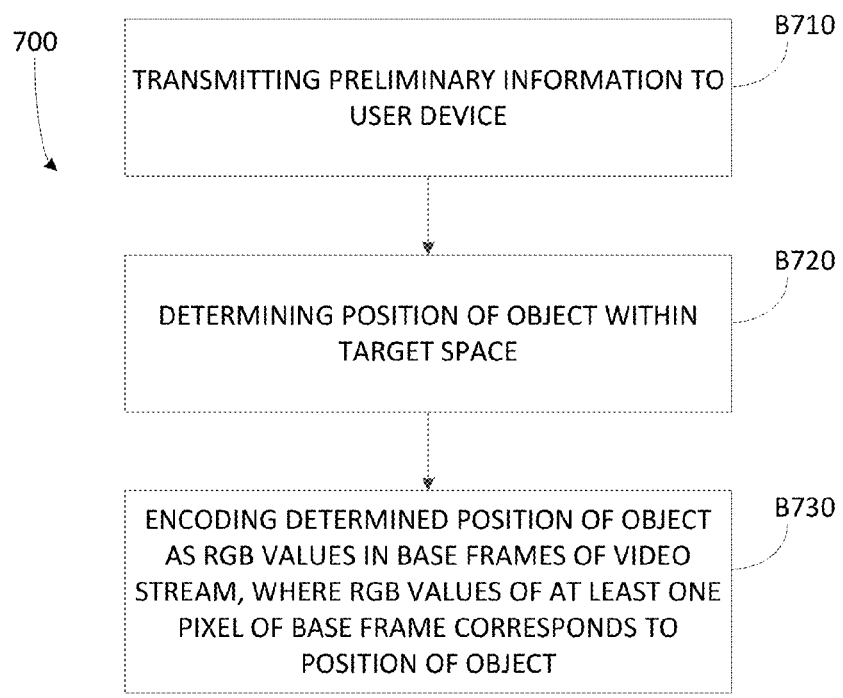
FIG. 7 is a process flowchart illustrating an example of a encoding method related to the backend device according to various embodiments.

FIG. 7 is a process flowchart illustrating an example of a encoding method 700 related to the backend device 110 according to various embodiments. Referring to FIGS. 1A-7, first at block B710, the backend device 110 may transmit preliminary information to the user device 140*n*, including at least one of: vertices mapping information, 3-dimensional object textual data, initial object position, static object information, object position decoding scheme, a combination thereof, and/or the like. The user device 140*n* may use the preliminary information for multiple frames, as long as the preliminary information is accurate.

The vertices mapping information may include the positions of vertices in the target space 105. The user device 140*n* may utilize the vertices mapping information to determine projection of the display characteristics/attributes associated with each vertex onto a 2-dimensional planar display device of the user interface 144. The vertices mapping information may also include the vertices associated with areas of a particular frame (e.g., the source frame 600*a*, the base frame 600*b*, and/or the like). The user device 140*n* may be utilized (as a part of the distributed computing framework) to perform at least a portion of the vertices determination process or the area-to-vertex mapping determination process based on the camera pose associated with the frames. In such cases, the user device 140*n* may store (at the memory 142) the results from its own processes locally while receiving the rest of the results from the backend device 110 (e.g., from the distribution server 116) or other user devices 140*a*-140*m*.

The 3-dimensional object textual data may include textual data of known objects, static or moving, within the target space 105. In some embodiments, as the reconstruction 3-dimensional model begins to operate, display characteristics/attributes may be monitored, for example, for a predetermined period of time (e.g., for a predetermined number of frames). A set of vertices (as a whole) having a same or substantially similar geometry and display characteristics/attributes that move together may be determined to be a same object. Given that an object may include two or more vertices such that many vertices may be within the external textual of the object, a textual wrap may be defined by the backend device 110 (e.g., the model builder 115). A corresponding reference (position) vertex may be defined that represent the entire object in the manner described. The user device 140n may be utilized (as a part of the distributed computing framework) to perform at least a portion of the object determination processes, where the model builder 115 outsources at least a part of the processing to the user device 140n. In such cases, the user device 140n may store (at the memory 142) the results from its own processes locally while receiving the rest of the results from the backend device 110 (e.g., from the distribution server 116) or other user devices 140a-140m.

The initial object position may correspond to the position of the object as associated with a representative reference vertex in any frame before the current frame. The static object information may be include textual data and position data of a static object defined by at least one vertex. The static object information may be determined in a similar manner as the object information (e.g., textual data and position data) of the moving objects. In addition, the object position (encoding and) decoding scheme in the form of metadata may also be shared between the backend device 110 and the user device 140. The position decoding scheme may be stored in the memory 142 and used by the rendering module 145 to decode the position of the objects. In various embodiments, the object may be segmented from the source frames (such as the source frame 600a) to allow capturing individual objects from multiple data sources (e.g., the data sources 120a-120h) at different camera poses. In some embodiments, a same object may be captured by two or more data sources at predetermined camera poses (e.g., at representative angles) to allow additional precise information as to the position of the object. Alternatively, an entire frame may be segmented and streamed.

Next at block B720, the backend device 110 (e.g., the model builder 115) may determine a position of an object within the target space 105 in the manner described. As described, the position of the object may be represented by at least one reference vertex.

Next at block B730, the backend device 110 (e.g., the model builder 115) may encode the determined position (reference vertex coordinates) of the object as RGB values in base frames (e.g., the base frame 600b) of a video stream, such that the RGB values of at least one pixel of each of the base frames may correspond to the position of the object. The video stream may include data such as, but not limited to the base data 225. In particular, the 3-dimensional coordinate values associated with the at least one vertex representing the position may be encoded in RGB format. The model builder 115 may take, as input, the reference vertex of the object and the source data 215 (e.g., the source frame 600a). The model builder 115 may recode the color scheme (in RGB model) of the source frame 600a into the base frame 600b, where the at least a portion of pixels of the base frame 600b may have RGB values corresponding to the coordinates of the reference vertex.

The base frame 600b may be transmitted as base data 225 from the model builder 115 to the distribution server 116. The distribution server 116 may, in turn, relay the base frame 600b (and/or the source frame 600a) to the user device 140n.

Given that multiple objects may be present (and moving from time to time) within the target space 105, multiple video streams including base frames (such as the base frame 600b) may be recoded from source frames (e.g., the source frame 600a) at the model builder 115 and streamed from the backend device 110 (e.g., the distribution server 116) to the user devices 140a-140n. Each of the multiple video streams may include encoded positions for at least one objects in the target space 105.

Figure 8:
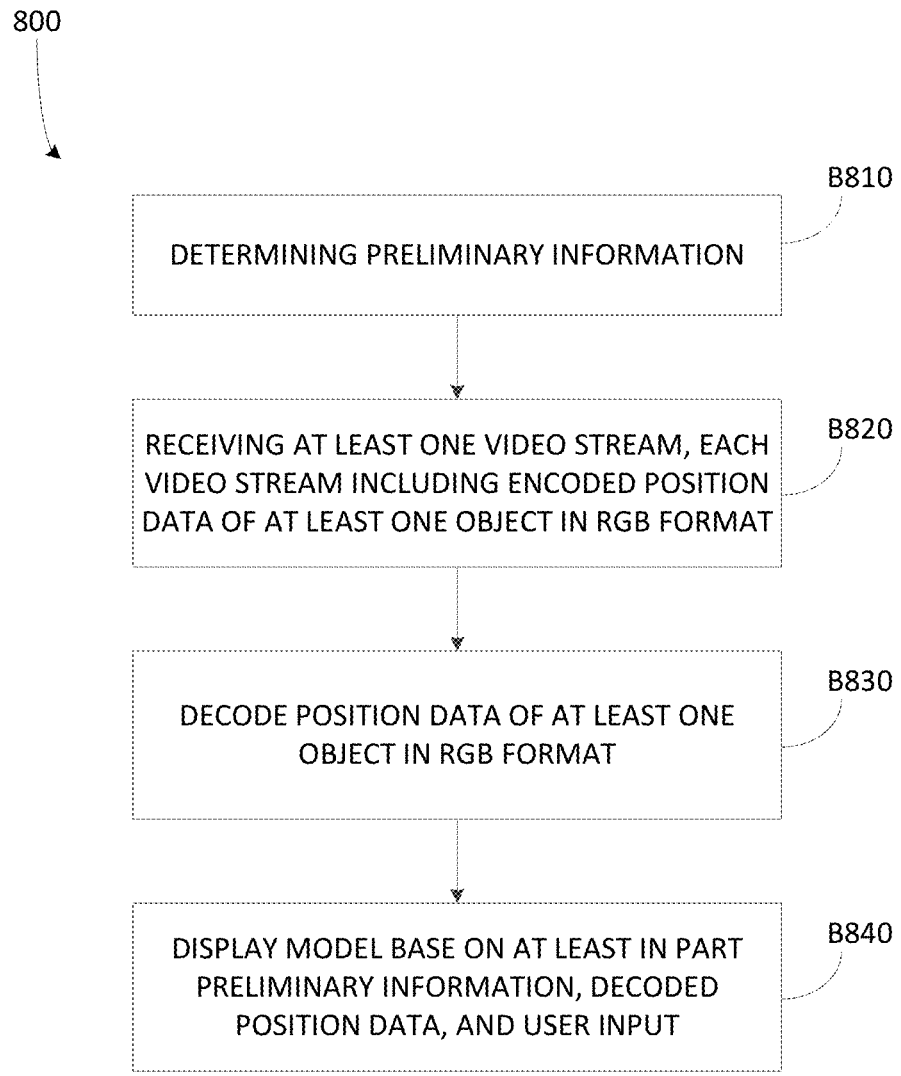
FIG. 8 is a process flowchart illustrating an example of a decoding method related to the user device according to various embodiments.

FIG. 8 is a process flowchart illustrating an example of a decoding method 800 related to the user device 140n according to various embodiments. Referring to FIGS. 1A-8, the user device 140n may determine preliminary information, including at least one of: vertices mapping information, 3-dimensional object textual data, initial object position, static object information, object position decoding scheme, a combination thereof, and/or the like, at block B810. In some embodiments, the user device 140n may determine the preliminary information by receiving it (via the network device 143 of the user device 140n) from the backend device 110. In other embodiments, at least a portion of the preliminary information may be determined locally by the processor 141 of the user device 140n and stored locally at the memory 142 of the user device 140n.

Next at block B820, the user device 140n may receive at least one video stream (e.g., the base data 225), each video stream including the encoded position data of at least one object in RGB values.

Next at block B830, the user device 140 may decode the encoded position data of the at least one object in RGB value. In some embodiments, the rendering module 145 may decode the encoded position data of the at least one object in RGB value based on the preliminary information (e.g., the object position decoding scheme).

Once position of the at least one object is known, the rendering module 145 may update the model of the target space 105 based on the position (represented by the reference vertex) of the object and the preliminary information. The model of the target space 105 stored in the memory 142 may be updated based on the preliminary information such as the vertices mapping information, 3-dimensional object textual data, initial object position, static object information, and/or the like.

Lastly at block B840, the user device 140 may display the updated model based on at least in part the preliminary information, the decoded position data, and the user input. For example, the user may input a desired perspective, view, distance, angle, position and/or the like to view the target space 105 from. The user may designate the user input with the input device of the user interface 144 (e.g., with a mouse or a touch screen). Based on the user input, the rendering module 145 may project the object textures (e.g., the geometry and display characteristics/attributes associated with the vertices) from a 3-dimensional context to a 2-dimensional planar display. The projected 2-dimensional planar display may accordingly be displayed by the user device of the user interface 114.

In some embodiments, the video streams of the base data 225 may be distributed in suitable forms such as, but not limited to, HTML5 video formats. In particular, MP4 or WebM may be implemented for real time streaming to HTML5 clients. As such, the widest range of user devices 140a-140n may be reached without using plugins (e.g., extra codes) on the browsers. CDNs such as CloudFront and Limelight may be used to allow charging a subscriber using one of the user devices 140a-140n when data may be transferred from the CDN (distribution server 116) to the user devices 140a-140n. Accordingly, the particular implementations described herein allow efficient streaming the base data 225 to user devices 140a-140n globally.

In some embodiments, the shader processing may allow each vertex in the rendering pipeline to be accessed and processed. The texture for an object may be packed, where the texture may correspond a position (as represented by a vertex in the manner described). When rendering, the rendering module 145 may map the texture from the updated 3-dimensional model unto a 2-dimensional plane of the display at the position. As such, a flat mesh is wrapped around (or above, below, to the side) the position (the reference vertex, which is now an area in 2-dimensional context) in shader language.

Figure 9:
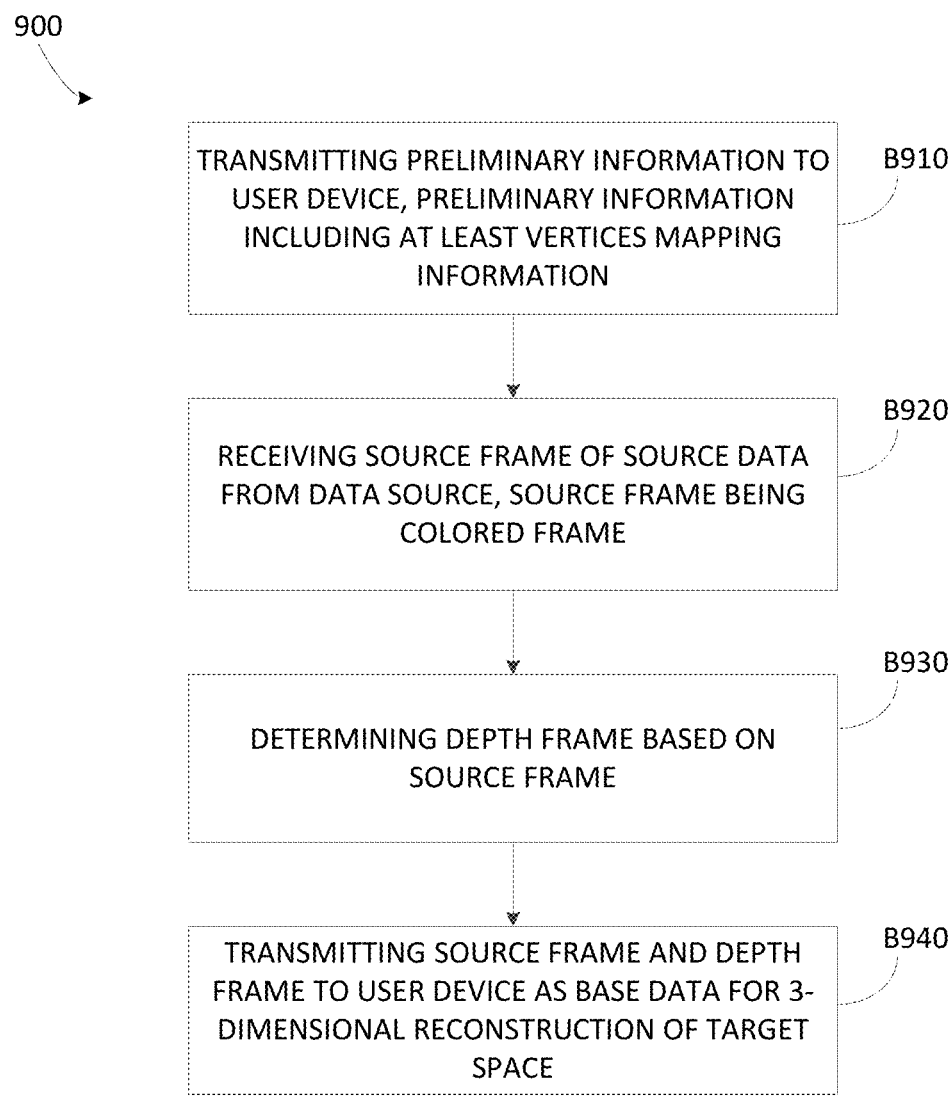
FIG. 9 is a process flowchart illustrating an example of a depth encoding method related to the backend device according to various embodiments.

FIG. 9 is a process flowchart illustrating an example of a depth encoding method 900 related to the backend device 110 according to various embodiments. Referring to FIGS. 1A-9, first at block B910, the backend device 110 may transmit, via the distribution server 116, preliminary information to the user device 140n, the preliminary information including at least the vertices mapping information.

Next at block B920, the backend device 110 may receive (via the network device 113 of the backend device 110) a source frame (e.g., the source frame 600a) of source data 215 from one of the data sources 120a-120h, the source frame being a colored frame. Next at block B930, the backend device 110 may determine, with the model builder 115, a depth frame based on the source frame in the manner described. Next at block B940, the backend device 110 (via the distribution server 116) may transmit the source frame and the depth frame to the user device 140n as base data 225 for 3-dimensional reconstruction of the target space 105.

Figure 10:
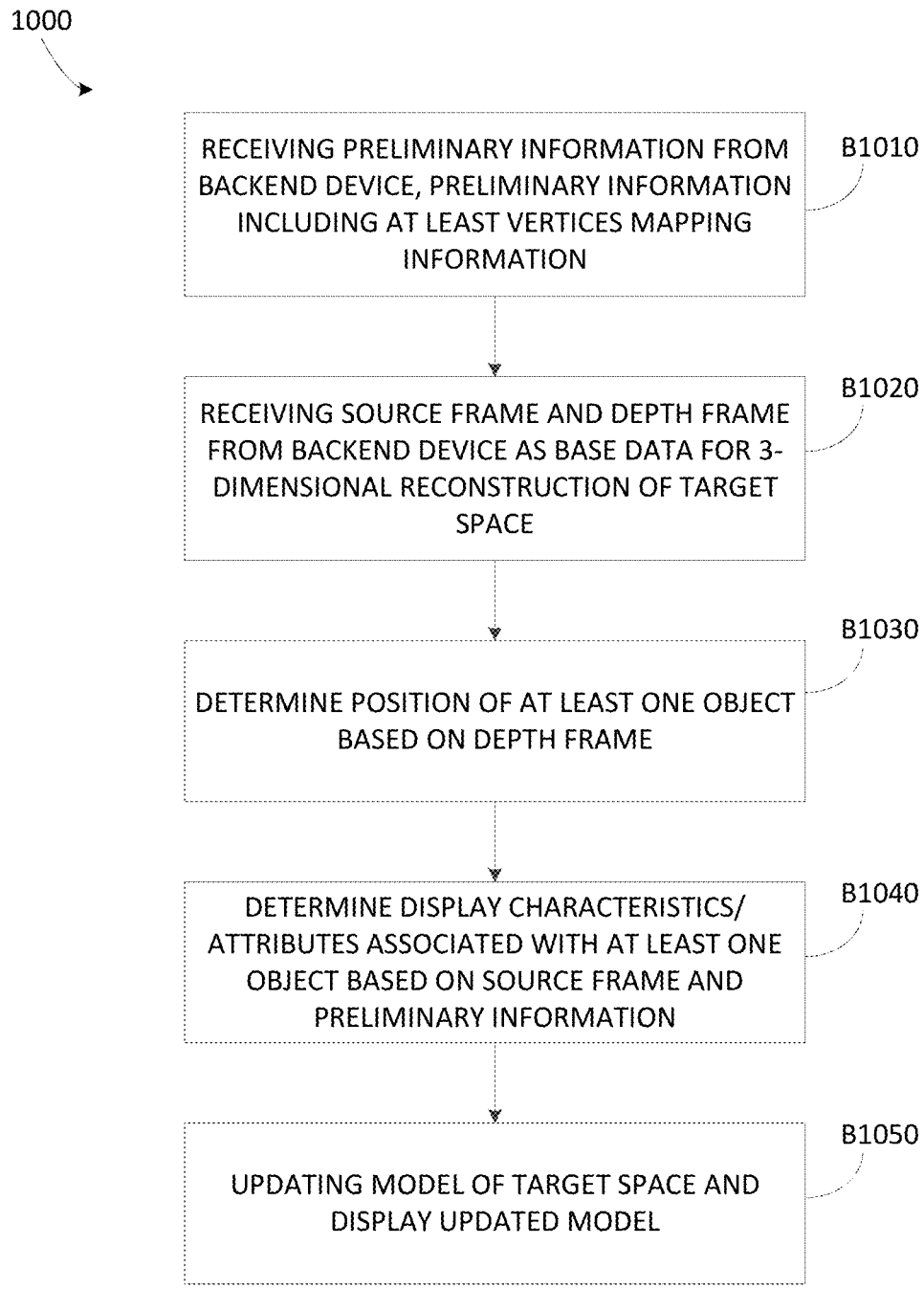
FIG. 10 is a process flowchart illustrating an example of a depth decoding method according to various embodiments.

FIG. 10 is a process flowchart illustrating an example of a depth decoding method 1000 according to various embodiments. Referring to FIGS. 1A-10, first at block B1010, the user device may receive, via the network device 143, the preliminary information from the backend device 110, the preliminary information including at least the vertices mapping information.

Next at block B1020, the user device 140n may receive (via the network device 143 of the user device 140n) the source frame and the depth frame from the backend device 110 as base data 225 for 3-dimensional reconstruction of the target space 105.

Next at block B1030, the user device 140n may determine position of at least one object based on the depth frame. In some embodiments, vertices associated with an identified object may be determined based on the depth video, given the depth video can be mapped onto the vertices in the manner described. For example, in shader language, the depth video may be indexed given the camera pose of the data source outputting the source video (from which depth video may be obtained) as well as the vertices mapping information, if needed. In other embodiments, position and/or vertices associated all objects within the depth video may be determined based on the depth video.

Next at block B1040, the user device 140n may determine display characteristics/attributes associated with the at least one object based on the source frame and the preliminary information. The areas in the source frame may be mapped to particular vertices based on the vertices mapping information (of the preliminary information). The display characteristics/attributes associated with the areas may be designated as the display characteristics/attributes of the associated vertices. Such display characteristics/attributes may be offset by a predetermined amount (e.g., half of the width of the video). Blocks B1030 and B1040 may be executed concurrently or sequentially in any order.

Next at block B1050, the rendering module 145 may update the model of the target space 105 based on the position of the at least one object, the display characteristics/attributes of the at least one object, and the preliminary information. Both geometry (as determined from the depth frame as rendered in shader language) and display characteristics/attributes (as determined from the colored source frame) for at least one object in the frames may be determined, for example, at blocks B1030 and B1040. The model stored in the memory 142 of the user device 140n may be accordingly updated. The model may be displayed according to the updated model. The rendering module 145 may project the updated model (3-dimensional) based on suitable projection matrices (e.g., an object-camera matrix) onto a 2-dimensional planar display outputted by the display device of the 144 of the user device 140n.

The user devices 140a-140n may implement browsers (e.g., Chrome) to execute processes described herein. In particular embodiments, no plugin may be necessary as HTML5 standards may be used. In some embodiments, a native IOS application may be implemented to execute processes described herein. Both the browser implementation and the native IOS implementation may consume a same type of live stream and render locally to the user devices 140a-140n via shader interpretation of the live streams (e.g., the base data 225). The user devices 140a-140n may be connected to a website linked to or otherwise hosted by the distribution server 116 for access to the live streams. Given that HTML5 is used, any modern web browser with sufficient computing power may access the CDN streams for rendering. When coupled with a reconstruction algorithm through which proper vertices may be provided, scaling the rendering of a live scene in the target space 105 across a typical CDN to millions of users may be achieved.

Figure 11:
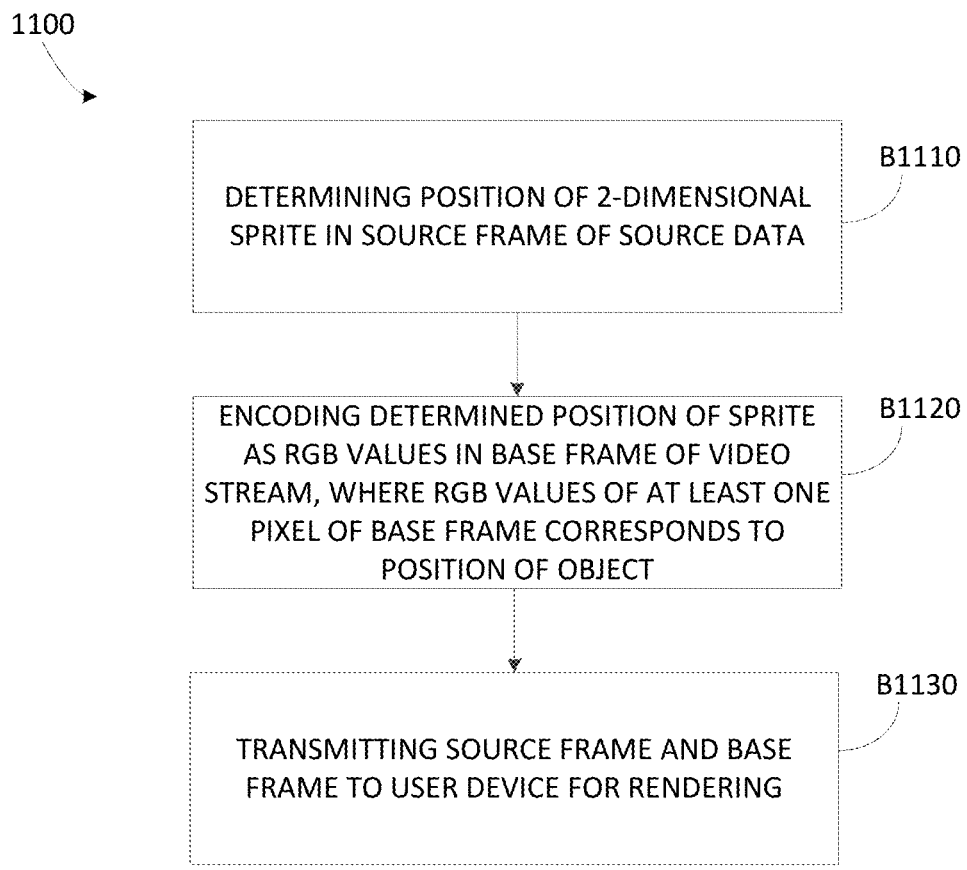
FIG. 11 is a process flowchart illustrating an example of a 2-dimensional sprite reconstruction method according to some embodiments.

The methods described herein may be applicable to a 2-dimensional sprite as well as a 3-dimensional object. FIG. 11 is a process flowchart illustrating an example of a 2-dimensional sprite reconstruction method 1100 according to some embodiments. For example, the backend device 110 (model builder 115) may determine position of a 2-dimensional sprite in a source frame (e.g., the source frame 600a) of source data (e.g., the source data 215) at block B1110. Given that the vertices mapping information has already been determined, an area on the source frame 600a may be mapped to at least one vertex. Thus, a reference vertex (e.g., at the bottom or center of the sprite) may be determined based on the corresponding area on the source frame 600a. Thus, a 3-dimensional coordinate for the reference vertex may be determined.

Next at block B1120, the backend device 110 (e.g., the model builder 115) may encode the determined position of the sprite as RGB values in a base frame (e.g., the base frame 600b) of a video stream, such that the RGB values of at least one pixel of the base frame may correspond to the position of the sprite. The video stream may data such as, but not limited to the base data 225. In particular, the 3-dimensional coordinate values associated with the at least one reference vertex representing the position of the sprite may be encoded in RGB format in the manner described.

Next at block B1130, the distribution server 116 of the backend device 110 may transmit the source frame and the base frame to the user device 140n for rendering. In various embodiments, the 2-dimensional sprite may be segmented out of the source frame, the source frame including the display characteristics/attributes associated with the sprite. The user device 140n may accordingly decode the updated position of the sprite from the encoded base frame and the display characteristics/attributes associated with the sprite from the source frame, by virtue of locally stored color scheme and vertices mapping information.

In some embodiments, the rendering may be aggregated into outputs videos that are too many for the user devices 140*a*-140*n*. In such cases, two or more video streams may be combined into a larger video stream using a hierarchy of peer connections. The final peer connections would generate the 4-5 output videos that all the user devices 140*a*-140*n* can consume. It is assumed that all the videos have a bitrate of 2-5 Mbps, based on the current average bandwidth in the US. Other bitrates may be used based on context.

Various embodiments described above with reference to FIGS. 1A-11 include the performance of various processes or tasks. In various embodiments, such processes or tasks may be performed through the execution of computer code read from computer-readable storage media. For example, in various embodiments, one or more computer-readable storage mediums store one or more computer programs that, when executed by a processor cause the processor to perform processes or tasks as described with respect to the processor in the above embodiments. Also, in various embodiments, one or more computer-readable storage mediums store one or more computer programs that, when executed by a device, cause the computer to perform processes or tasks as described with respect to the devices mentioned in the above embodiments. In various embodiments, one or more computer-readable storage mediums store one or more computer programs that, when executed by a database, cause the database to perform processes or tasks as described with respect to the database in the above embodiments.

Thus, embodiments include program products including computer-readable or machine-readable media for carrying or having computer or machine executable instructions or data structures stored thereon. Such computer-readable storage media can be any available media that can be accessed, for example, by a general purpose or special purpose computer or other machine with a processor. By way of example, such computer-readable storage media can include semiconductor memory, flash memory, hard disks, optical disks such as compact disks (CDs) or digital versatile disks (DVDs), magnetic storage, random access memory (RAM), read only memory (ROM), and/or the like. Combinations of those types of memory are also included within the scope of computer-readable storage media. Computer-executable program code may include, for example, instructions and data which cause a computer or processing machine to perform certain functions, calculations, actions, or the like.

The embodiments disclosed herein are to be considered in all respects as illustrative, and not restrictive. The present disclosure is in no way limited to the embodiments described above. Various modifications and changes may be made to the embodiments without departing from the spirit and scope of the disclosure. Various modifications and changes that come within the meaning and range of equivalency of the claims are intended to be within the scope of the disclosure.

What is claimed is:

1. A method comprising:
   determining a position of an object within a target space;
   encoding the position of the object as RGB values;
   generating a base frame formed of pixels, wherein each pixel is either encoded with the RGB values corresponding to the position of the object or encoded with constant filler RGB values, and
   wherein a portion of the pixels of the base frame are encoded with the RGB values corresponding to the position of the object, and the rest of the pixels are encoded with the constant filler RGB values;
   and transmitting the base frame to a user device for decoding the position of the object.

2. The method of claim 1, wherein:
   the target space is a 3-dimensional volume; and
   the target space is defined by a plurality of vertices.

3. The method of claim 1, wherein the position of the object is defined by a vertex associated with coordinates on a 3-dimensional coordinate system.

4. The method of claim 3, wherein the encoding the position of the object as RGB values comprises:
   setting a first coordinate value of the vertex to a corresponding R value;
   setting a second coordinate value of the vertex to a corresponding G value; and
   setting a third coordinate value of the vertex to a corresponding B value.

5. The method of claim 1, further comprising receiving a source frame from a data source, wherein the source frame is a 2-dimensional frame of a source video stream.

6. The method of claim 5, wherein the determining the position of the object within the target space comprises identifying the object on the source frame.

7. The method of claim 6, wherein the determining the position of the object within the target space further comprises identifying a reference vertex associated with the position of the object.

8. The method of claim 5, wherein the base frame is encoded from the source frame.

9. The method of claim 1, further comprising transmitting preliminary information to the user device, wherein the preliminary information comprising one or more of: 3-dimensional object textual data, and object position decoding scheme, wherein:
   the 3-dimensional object textual data comprises data associated with texture of the object, and
   the object position decoding scheme comprises metadata corresponding to the manner in which the position of the object is encoded into RGB values.

10. The method of claim 1, wherein all pixels of the base frame are encoded with the RGB values corresponding to the position of the object.

11. The method of claim 1, wherein at least two pixels of the base frame are encoded with the RGB values corresponding to the position of the object.

12. The method of claim 1, wherein the constant filler values are zero (0) for each of R value, G value, and B value.

13. An apparatus, comprising:
   a model builder configured to:
   determine a position of an object within a target space; and
   encode the position of the object as RGB values;
   generate a base frame formed of pixels, wherein each pixel is either encoded with the RGB values corresponding to the position of the object or encoded with constant filler RGB values, and
   wherein a portion of the pixels of the base frame are encoded with the RGB values corresponding to the position of the object, and the rest of the pixels are encoded with the constant filler RGB values; and
   a distribution server configured to transmit the base frame to a user device for decoding the position of the object.

14. The apparatus of claim 13, wherein:
   the target space is a 3-dimensional volume; and
   the target space is defined by a plurality of vertices.

15. The apparatus of claim 13, wherein the position of the object is defined by a vertex associated with coordinates on a 3-dimensional coordinate system.

16. The apparatus of claim 15, wherein the model builder encodes the position of the object as RGB values by:
  setting a first coordinate value of the vertex to a corresponding R value;
  setting a second coordinate value of the vertex to a corresponding G value; and
  setting a third coordinate value of the vertex to a corresponding B value.

17. The apparatus of claim 13, the model builder is further configured to receive a source frame from a data source, wherein the source frame is a 2-dimensional frame of a source video stream.

18. The apparatus of claim 17, wherein the model builder determines the position of the object within the target space by identifying the object on the source frame.

19. The apparatus of claim 18, wherein the model builder determines the position of the object within the target space by further identifying a reference vertex associated with the position of the object.

20. The apparatus of claim 19, wherein the base frame is encoded from the source frame.

21. The apparatus of claim 13, the distribution server is further configured to transmit preliminary information to the user device, wherein the preliminary information comprising one or more of: 3-dimensional object textual data, and object position decoding scheme, wherein:
  the 3-dimensional object textual data comprises data associated with texture of the object, and
  the object position decoding scheme comprises metadata corresponding to the manner in which the position of the object is encoded into RGB values.

22. A non-transitory computer-readable storage medium storing program instructions that, when executed, causes a processor to:
  determine a position of an object within a target space;
  encode the position of the object as RGB values;
  generate a base frame formed of pixels, wherein each pixel is either encoded with the RGB values corresponding to the position of the object or encoded with constant filler RGB values, and
  wherein a portion of the pixels of the base frame are encoded with the RGB values corresponding to the position of the object, and the rest of the pixels are encoded with the constant filler RGB values; and
  transmit the base frame to a user device for decoding the position of the object.

23. The non-transitory computer-readable storage medium of claim 22, wherein:
  the position of the object is defined by a vertex associated with coordinates on a 3-dimensional coordinate system; and
  to encode the position of the object as RGB values comprises:
    to set a first coordinate value of the vertex to a corresponding R value;
    to set a second coordinate value of the vertex to a corresponding G value; and
    to set a third coordinate value of the vertex to a corresponding B value.

* * * * *